(12) United States Patent
Augustsson

(10) Patent No.: US 6,345,136 B1
(45) Date of Patent: Feb. 5, 2002

(54) TUNEABLE ADD/DROP MULTIPLEXER

(75) Inventor: Torsten Augustsson, Upplands Väsby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/400,486

(22) Filed: Sep. 21, 1999

(30) Foreign Application Priority Data

Sep. 22, 1998 (SE) .............................................. 9803212

(51) Int. Cl.[7] .............................. G02B 6/34; G02F 1/295
(52) U.S. Cl. ................................. 385/37; 385/3; 385/10
(58) Field of Search ................................ 385/16, 17, 20, 385/21, 3, 8–10, 37, 31

(56) References Cited

U.S. PATENT DOCUMENTS

| | | | | |
|---|---|---|---|---|
| 5,448,390 A | * | 9/1995 | Tsuchiya et al. | 359/132 |
| 5,579,143 A | | 11/1996 | Huber | 359/130 |
| 5,933,554 A | * | 8/1999 | Leuthold et al. | 385/28 |
| 5,953,467 A | * | 9/1999 | Madsen | 385/15 |
| 6,005,992 A | * | 12/1999 | Augustsson et al. | 385/16 |

FOREIGN PATENT DOCUMENTS

| | | |
|---|---|---|
| EP | 0720408 | 7/1996 |
| SE | 508871 | 9/1998 |

OTHER PUBLICATIONS

Agrawal et al., Phase–Shifted Fiber Bragg Gratings and their Application for Wavelength Demultiplexing, IEEE Photon. Tech Lett., vol. 6(8), pp. 995–997, 1994.

Soldano et al., "Optical Multi Mode Interference Devices Based on Self Imaging: Principles and Application," J. Lightwave Technology, vol. 13(4), pp. 615–627, 1995.

Weber et al., "A New Type of tunable demultiplexer using a multi–leg Match–Zehnder Interferometer," Proc. ECIO 97 EthE5, Stockholm, pp. 272–275, 1997.

"Singe Mode Optical Isolator at 1.3 $\mu$m Using All Fibre Components," Electronics Letters, Jun. 19, 1996, vol. 22, No. 13, pp. 711–713.

* cited by examiner

Primary Examiner—Huy Mai
(74) Attorney, Agent, or Firm—Burns, Doane, Swecker & Mathis, L.L.P.

(57) ABSTRACT

The present invention relates to a tuneable add/drop demultiplexer. The add/drop multiplexer includes at least one N×N MMI-waveguide (10), where N≧3, at least N-number of Michelson waveguides (31, 32, 33 and 34), at least one Bragg grating (62, 64 and 66) per Michelson waveguide (31, 32, 33 and 34) and at least one phase control element (51, 53, 55 and 57) in at least N−1 number of Michelson waveguides (31, 32, 33 and 34). The Michelson waveguides (31, 32, 33 and 34) include said phase control elements (51, 53, 55 and 57) and said Bragg gratings (62, 64 and 66) and are coupled to at least one MMI-waveguide (10). Each Michelson waveguide (31, 32, 33 and 34) can be provided with a broadband reflection section (70). The invention also relates to a method for tuneable add/drop multiplexing, the use of a wavelength selective switch as a tuneable add/drop multiplexer and the use of a tuneable add/drop multiplexer as a wavelength selective switch.

34 Claims, 11 Drawing Sheets

TUNEABLE ADD/DROP MULTIPLEXER

FIELD OF INVENTION

The present invention relates to a method, an arrangement and the use of an arrangement for tuneable add/drop multiplexing and for wavelength selective switching.

BACKGROUND OF THE INVENTION

There are known to the art a number of different methods for further enhancing the capacity of an optical transmission line (point-to-point connection) or in an optical network (multipoint-to-multipoint connection). One method involves the use of a so-called wavelength division multiplexing (WDM) technique for improving the extent to which available bandwidths are utilised on an optical fibre in the optical network, where the information is multiplexed with the aid of an optical wavelength multiplexer. The wavelength can also be used as an information address in an optical network. Enhancement of the flexibility of the network necessitates the presence of devices that are able to reroute traffic in the optical network. Such traffic rerouting devices, or arrangements, are also suitable for using the network in the most effective manner possible, and in the case of a network crash or gilch.

In the case of bus and ring networks for instance, add/drop multiplexers are central to effective communication with the network. It is important that the add/drop multiplexer can be tuned (change add/drop wavelength), when a node wishes to change communication channels. Swedish Patent Application SE 9700865-0 describes a wavelength selective 1-N switch and multi-add/drop with fixed add/drop wavelength channels.

This Swedish patent application also describes an arrangement which does not provide tuneable (selectable) add/drop multiplexing.

SUMMARY OF THE INVENTION

A number of different, known methods can be used to enhance the capacity of an optical transmission system.

In wavelength multiplexing, for instance, transmission channels are respectively multiplexed and demultiplexed to and from an information flow on different carrier wavelengths. This multiplexing and demultiplexing process requires the presence of optical wavelength selective devices. In bus and ring networks for instance, add/drop multiplexers are central to effective communication with the network. If a node wishes to change a communication channel, it is important to be able to tune the add/drop multiplexer (change add/drop wavelength).

One problem in this regard is that a known tuneable add/drop multiplexer may be consistent with high channel-dependent losses, crosstalk problems, and a high price.

The present invention addresses the aforesaid problem with a tuneable add/drop multiplexer that includes at least one MMI-waveguide, at least N-number of Michelson waveguides, where $N \geq 4$, at least one Bragg grating for each Michelson waveguide, and at least one phase control element in at least N–1 number of Michelson waveguides. The Michelson waveguides include said phase control elements and said Bragg gratings and are arranged for at least one MMI-waveguide. Each Michelson waveguide can be provided with a broadband reflection grating.

In a preferred embodiment, the broadband reflection gratings are arranged at the end of each Michelson waveguide.

In another embodiment of the inventive tuneable add/drop multiplexer, there is included at least one MMI-waveguide which is provided on a first side with at least four access waveguides and on a second side with at least four Michelson waveguides, one N-channel (de)multiplexer for each said Michelson waveguide, one reflection section per Michelson waveguide, wherein said reflection section includes N-number of Michelson waveguides for each said N-channel (de)multiplexer, wherein each such Michelson waveguide includes at least one Bragg grating, and wherein at least N-number of Michelson waveguides include at least one phase control element.

In another embodiment, the inventive tuneable add/drop multiplexer includes at least two MMI-waveguides, at least M-number of Michelson waveguides per MMI-waveguide, where $M \geq 3$, at least one Bragg grating per Michelson waveguide, and at least one phase control element in at least M–1 number of Michelson waveguides per MMI-waveguide. The Michelson waveguide includes said phase control element and said Bragg grating and is provided on a second side of the MMI-waveguides. An access waveguide provided on a first side of a first MMI-waveguide and an access waveguide provided on a first side of a second MMI-waveguide are mutually connected via a connection waveguide.

In a preferred embodiment of the aforesaid inventive, tuneable add/drop multiplexer, there is arranged an 1×N switch for each Michelson waveguide in connection with the second side of the MMI-waveguides, and a reflection section that includes said Bragg grating and said phase control element is provided for each such switch.

The MMI-waveguides are preferably a 3×3 type waveguide. The tuneable add/drop multiplexer may also include a broadband reflection grating for each Michelson waveguide. These gratings are preferably arranged at the end of each Michelson waveguide.

In a further embodiment of the inventive tuneable add/drop multiplexer, said M-number of Michelson waveguides, where $M \geq 3$, are arranged between a second side of the first MMI-waveguide and a second side of the second MMI-waveguide. Each Michelson waveguide includes at least two Bragg gratings, and at least M–1 numbers of Michelson waveguides include at least three phase control elements. The components thus function as an MMIMZI (Multi Mode Interference Mach-Zehnder Interferometer) for transmitted channels.

According to yet another embodiment of the inventive add/drop multiplexer, the multiplexer includes a third and a fourth MMI-waveguide. At least M-number of Michelson waveguides, where $M \geq 3$, are arranged between the third and the fourth MMI-waveguide. Each Michelson waveguide includes at least two Bragg gratings, and at least M–1 number of Michelson waveguides include at least three phase control elements. An access waveguide provided on the third or on the fourth MMI-waveguide via a connecting waveguide, and an access waveguide provided on the third MMI-waveguide is coupled to an access waveguide on the fourth MMI-waveguide via a connecting waveguide.

The third and the fourth MMI-waveguides are preferably of the 3×3 type.

The invention also relates to a first method for add/drop multiplexing optical waveguide channels in an optical network. Optical wavelength channels are excited into an access waveguide arranged on a first side of an MMI-waveguide. No optical add-wavelength channel or at least one optical add-wavelength channel is excited into a second access waveguide arranged on the first side of the MMI-waveguide. The optical wavelength channels, including the add-wavelength channel, are transmitted through said first MMI-waveguide and are imaged on at least one Michelson waveguide arranged on the opposite side relative to said access waveguide. The optical wavelength channels, including the add-wavelength channel, are transmitted through the Michelson waveguides. The phase of no optical wavelength channel or at least one of the optical wavelength channels is changed by any of the phase control elements in any of the Michelson waveguides.

At least one optical wavelength channel is reflected by a Bragg grating section arranged in the Michelson waveguide. No or at least one wavelength channel is dropped to a third access waveguide arranged on the first side of the MMI-waveguide. No or at least one wavelength channel is transmitted out through a fourth access waveguide arranged on the first side of the MMI-waveguide.

Those wavelength channels that have not been reflected by a Bragg grating can be reflected by a broadband reflection grating arranged in each of the Michelson waveguides.

The invention also relates to a second method for tuneable add/drop multiplexing of optical wavelength channels in an optical network. Optical wavelength channels are excited into a first access waveguide arranged on a first side of a first MMI-waveguide. The optical wavelength channels are transmitted through said first MMI-waveguide and imaged on at least one Michelson waveguide arranged on an opposite side in relation to said access waveguide. The optical wavelength channels are transmitted through the Michelson waveguides. The phase of none or at least one of the optical wavelength channels is changed by any of the phase control elements arranged in each Michelson waveguides. At least one optical wavelength channel is reflected by at least one Bragg grating section arranged in the Michelson waveguides. None or at least one wavelength channel is dropped to a second access waveguide arranged on the first side of the first MMI-waveguide. At least one wavelength channel is transmitted out through a third access waveguide arranged on the first side of the first MMI-waveguide. Said wavelength channel is transmitted through a connecting waveguide arranged between the first and the second MMI-waveguide. Said wavelength channel(s) is/are transmitted through said second MMI-waveguide and imaged on at least one Michelson waveguide arranged on the opposite side relative to said access waveguide.

The phase of no wavelength channel or at least one optical wavelength channel is changed by any phase control element arranged in any of the Michelson waveguides. At least one optical wavelength channel is reflected by a Bragg grating section arranged in the Michelson waveguides. None or at least one add-wavelength channel is excited into a second access waveguide arranged on the first side of the second MMI-waveguide. None or at least one wavelength channel is transmitted out through a third access waveguide arranged on the first side of the second MMI-waveguide.

Those wavelength channels that have not been reflected by a Bragg grating can be reflected by at least one broadband reflection grating arranged in each Michelson waveguide.

The wavelength channel or wavelength channels that is/are transmitted out through the third access waveguide arranged on the first side of the second MMI-waveguide can be excited in via a connecting waveguide in a first access waveguide arranged on a first side of a third MMI-waveguide. The optical wavelength channels are transmitted through said third MMI-waveguide and imaged on at least one Michelson waveguide arranged on an opposite side relative to said access waveguide. The optical wavelength channels are transmitted through the Michelson waveguides. The phase of at least one of the optical wavelength channels is changed by a phase control element arranged in a Michelson waveguide. At least one optical wavelength channel is reflected by at least one Bragg grating section arranged in the Michelson waveguides. No wavelength channel or at least one wavelength channel is dropped to a second access waveguide arranged on the first side of the third MMI-waveguide. At least one wavelength channel is transmitted out through a third access waveguide arranged on the first side of the third MMI-waveguide. Said wavelength channel is transmitted through a connecting waveguide arranged between an access waveguide on the third MMI-waveguide and an access waveguide arranged on the fourth MMI-waveguide. Said wavelength channel is transmitted through said fourth MMI-waveguide and imaged on at least one Michelson waveguide arranged on an opposite side relative to said access waveguide. The phase of no optical wavelength channel or at least one optical wavelength channel is changed by any phase control element arranged in any of the Michelson waveguides. At least one optical wavelength channel is reflected by at least one Bragg grating section arranged in the Michelson waveguides. No add-wavelength channel or at least one add-wavelength channel is excited into a second access waveguide arranged on the first side of the fourth MMI-waveguide. No wavelength channel or at least one wavelength channel is transmitted out through a third access waveguide arranged on the first side of the fourth MMI-waveguide.

The aforesaid MMI (Multi Mode Interference) structure is used for splitting and as a phase-dependent combiner of light. The intensity distribution of light at the inputs of an MMI structure is imaged on all outputs of the MMI structure, provided that its length has been correctly chosen. A more profound theory behind this is found in L. B. Soldano and E. C. M. Pennings, "Optical Multi Mode Interference Devices Based on Self Imaging: Principles and Application", J. Lightwave Technology, Vol. 13(4), pp. 615–627, 1995.

Bragg gratings are used to filter light. The grating allows light of certain wavelengths to pass through while reflecting light of other wavelengths. Bragg gratings can be said to form some kind of wavelength selective mirror. A more basic theory can be read from Phase-shifted Fiber Gratings and their Application for Wavelength Demultiplexing, IEEE Photon. Tech. Lett., Vol. 6(8), pp. 995–997, 1994. In, for instance, SiO2/Si, a periodic material index is created in the waveguide, by illuminating said waveguide periodically with UV light.

The aforesaid phase control elements are required for certain switching functions and for correcting process imperfections. Several types of phase control elements are known. However, a basic feature of these elements is that the optical wavelength is influenced by an applied external signal (voltage, current, light or heat). Normally, there is used a so-called thermooptical element, that is to say the refractive index and therewith the wavelength is influenced with the aid of heat (a temperature change results in a change of the refractive index.

The invention also includes the use of a wavelength selective switch and a tuneable add/drop multiplexer. The wavelength selective switch includes at least one MMI-waveguide, at least four Mach-Zehnder waveguides, at least one Bragg grating, and at least one phase control element with each Mach-Zehnder waveguide. Where said Mach-Zehnder waveguide includes said phase control element and said Bragg grating and is provided for at least one MMI-waveguide.

The object of the present invention is to provide a tuneable add/drop multiplexer that can achieve lower losses, channel-independent losses, and less crosstalk problems than are experienced with available, tuneable add/drop multiplexers, and also to obtain a wavelength selective switch with dimensions M×N, where M and N are positive integers.

The invention will now be described in more detail with reference to preferred embodiments thereof and also with reference to the accompanying drawings.

DESCRIPTION OF PREFERRED EMBODIMENTS

Figure 1:
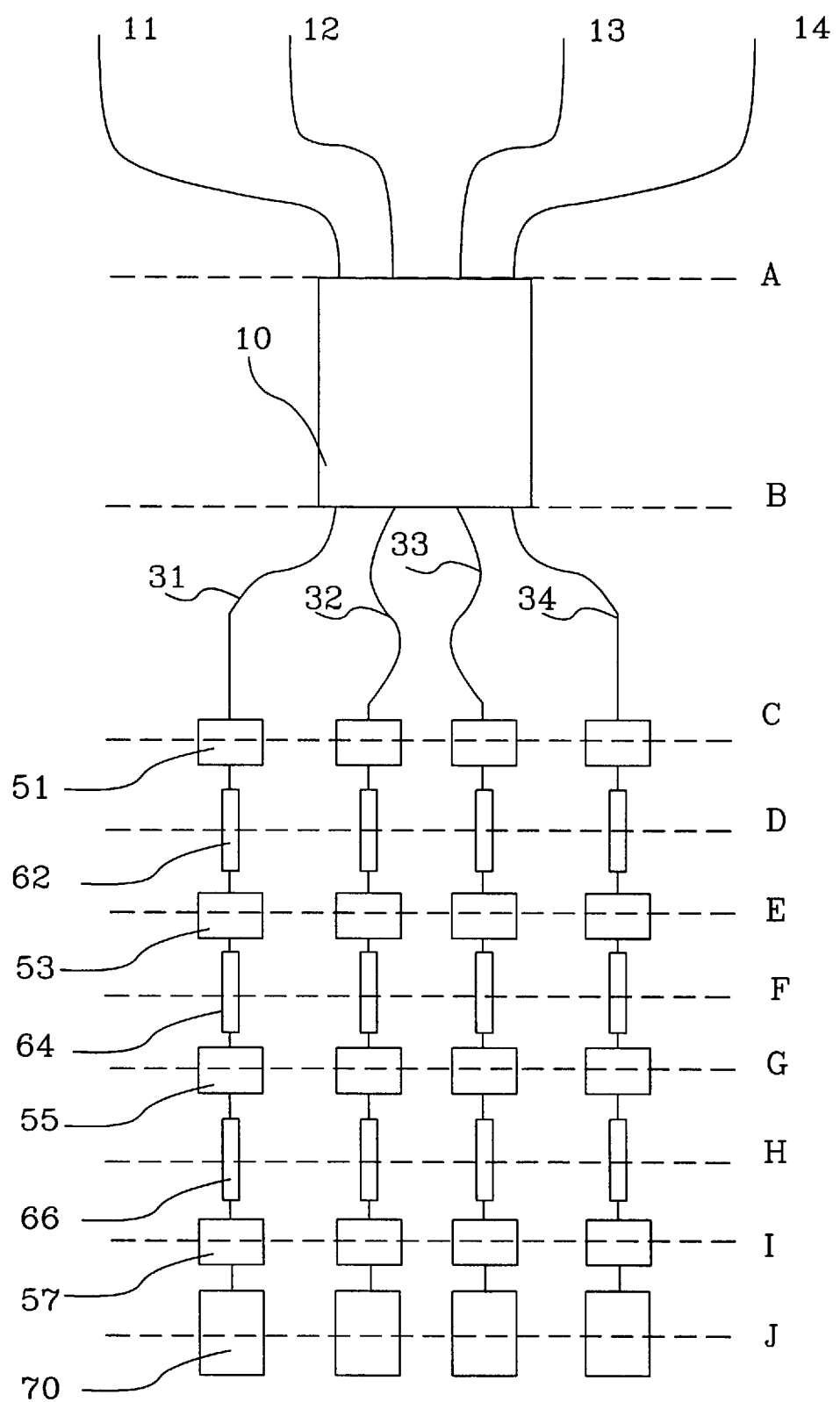
FIG. 1 illustrates one embodiment of an inventive tuneable add/drop multiplexer.

In FIG. 1 there is shown a tuneable add/drop multiplexer according to the invention. The support lines A–J illustrate sections that are used to describe the invention. In the case of the FIG. 1 embodiment, the tuneable add/drop multiplexer includes four access waveguides 11, 12, 13, 14, one MMI-waveguide 10, four phase control elements 51, 53, 55 and 57 per Michelson waveguide, three Bragg gratings 62, 64 and 66 Michelson waveguide, and one broadband reflection gratings 70 per Michelson waveguide. One of the Michelson waveguides is able to manage without a phase control element. The access waveguides 11, 12, 13 and 14 are arranged on a first side of the MMI-waveguide. The Michelson waveguides are arranged on a second side of the MMI-waveguide 10. Arranged in the Michelson waveguides 31, 32, 33 and 34 are said phase control elements 51, 53, 55 and 57, the Bragg gratings 62, 64 and 66, and the broadband reflection gratings 70. The broadband reflection gratings 70 have been placed at the end of the Michelson waveguides 31, 32, 33 and 34 in this embodiment. However, these broadband reflection gratings 70 may conceivably be arranged at the beginning of said Michelson waveguides 31, 32, 33 and 34. When the broadband reflection gratings are arranged at the beginning of the Michelson waveguides, their reflection sections must be provided with openings (windows) for those channels that shall later be handled by the Bragg gratings. An example of one such broadband reflection grating provided with windows is described in G.P. Agrawal and S. Radic, Phase-shifted Fiber Gratings and their Application for Wavelength Demultiplexing, IEEE, Photon. Tech. Lett., Vol. 6(8), pp. 995–997, 1994.

The tuneable add/drop multiplexer according to the FIG. 1 embodiment is able to handle three different wavelengths $\lambda 1$, $\lambda 2$ and $\lambda 3$ individually, i.e. each of these wavelengths can be chosen to be excited out to one of the four access waveguides 11, 12, 13 and 14 on the first side of the MMI-waveguide 10. Since this arrangement is primarily conceived for use as a tuneable add/drop multiplexer, only two of the four available access waveguides 11, 12, 13 and 14 will be concerned, partly that wavelength or those wavelengths to be dropped and partly those wavelengths or wavelength that will not be dropped. The wavelength channels that have not been reflected by a Bragg grating 62, 64 or 66 can be reflected by the broadband reflection grating 70 arranged at the end of the Michelson waveguide 31, 32, 33 and 34. Those wavelengths that are reflected by the broadband reflection gratings 70 can be chosen to be dropped or not to be dropped with the aid of the phase control element 57.

Of course, the aforesaid tuneable add/drop multiplexer can be upgraded to include Q-number of wavelength channels that can be handled individually, instead of solely three wavelength channels $\lambda 1$, $\lambda 2$ and $\lambda 3$ as in the aforesaid embodiment. However, in order for the tuneable add/drop multiplexer to be able to handle Q-number of wavelength channels independently of one another, it will be necessary for said multiplexer to include Q×N-number of Bragg gratings, (N−1)XQ-number of phase control elements, N-number of access waveguides arranged on the first side of the MMI-waveguide, and N-number of Michelson waveguides arranged on the other side of said MMI-waveguide in respect of one N×N MMI-waveguide.

Assume that light is excited in at the access waveguide 11 belonging to the MMI-waveguide 10 at section A. The length of the MMI-waveguide 10 is selected so that N-number of images or reproductions of the light intensity from the access waveguide 11 at section A is achieved in the MMI-waveguide 10 along section B. Also assume that the structure and dimensions of the MMI-waveguide 10 have been selected so that four images, i.e. N=4, of the original distribution in the access waveguide 11 is achieved. Then, if the access waveguides 11, 12, 13 and 14 have been arranged at the MMI-waveguide 10 correctly, i.e. have been dimensioned and positioned correctly, and if the cross-sectional dimensions and positions of the Michelson waveguides 31, 32, 33 and 34 have been chosen correctly, a large part of the energy in the images will be coupled to the Michelson waveguides 31, 32, 33 and 34. The maximum energy of these images is <1/N of the energy along section A if perfect uniformity is achieved, in this case <¼ of the energy along section A. Deviation of this intensity distribution will be very small if light is excited from one of the access waveguides 12–14 along section A instead.

Sections along the support lines D, F and H denote Bragg grating sections. The Bragg grating sections along respective support lines may be mutually identical, in which case the grating sections will reflect respective wavelengths along respective support lines for each of the Michelson waveguides 31, 32, 33 and 34. The wavelengths that are reflected by a Bragg grating return to the MMI-waveguide 10 with the phase relationship determined by the phase control elements 51, 53 and 55.

For instance, assume that the Bragg gratings along section D reflect a wavelength $\lambda 1$ and that the Bragg gratings along section F reflect a wavelength $\lambda 2$. The phase control element 51 along section C will then determine which access waveguide 11–14 will be the output port for wavelength $\lambda 1$, and the phase control element 53 along section E will determine which access waveguide 11–14 will be the output port for wavelength $\lambda 2$. The same applies along section G, i.e. respective phase control element 55 along said section will determine which of the access waveguides 11–14 will be the output port for the wavelength $\lambda 3$ that has been reflected by the Bragg gratings along section H.

The phase relationship into the MMI-waveguide 10 in the reverse direction can thus be chosen individually for each wavelength. In other words, each wavelength channel can be given an outport independently of other wavelength channels. This presumes, of course, that the phase control element 53 along section E, for instance, can compensate for the phase control element 51 along section C, and that phase control element 55 along section G can compensate for the phase control elements 51 and 53 along section C and E respectively, and that phase control element 57 along section I can compensate for the phase control elements 51, 53 and 55 along respective sections C, E and G. Generally speaking, each phase control element shall be able to compensate for those upstream phase control elements in the transmission paths of the channels along said Michelson waveguide.

The phase control element 51 along the line C will, of course, also influence the wavelength channels $\lambda 2$ and $\lambda 3$. However, this compensation can be easily controlled with the aid of software in accordance with theories that are well known to the person skilled in this art and that need not therefore be described in more detail in this document. If it is not desired to control this compensation with the aid of software, the phase control elements 51, 53, 55 and 57 can be successively extended from section C in a direction towards section I in some suitable way.

The wavelength channel or channels that has/have not been reflected by a Bragg grating will reach the broadband reflection gratings 70. When the Michelson waveguides 31, 32, 33 and 34 have equivalent lengths, those wavelength channels that are reflected by the broadband reflection gratings 70 will be focused on the same access waveguides arranged on the first side of the MMI-waveguide.

FIG. 1 illustrates the principle according to which Q+Y wavelength channels are handled by a 4×4 MMI-waveguide. Q channels can be dropped and/or added to a channel stream on Q+Y channels. The number of channels Q is restricted by the number of Bragg gratings and phase control elements. Those wavelength channels Y that are not reflected individually are reflected in the broadband reflection section and controlled by forwardly lying phase control elements. Three wavelength channels can be handled individually in the illustrated case, whereas the remaining wavelength channels cannot be controlled individually. Add and drop are both performed in the same structure in this case. The MMI structure functions as a splitter from above and down, according to FIG. 1, for both transmission channels and add-channels. The channels are then reflected in respective Bragg grating sections. When the reflected power again reaches the MMI structure, the relative phase distribution in the interface between the Michelson waveguides along section B will determine where the power will be focused along section A. Two of the access waveguides, for instance waveguides 11 and 12, function as wavelength channel inputs, where one of said channels is intended for the add-wavelength channel and the remaining two access waveguides function as outputs for the wavelength channels, where one of said channels is intended for the drop-wavelength channel.

Figure 2:
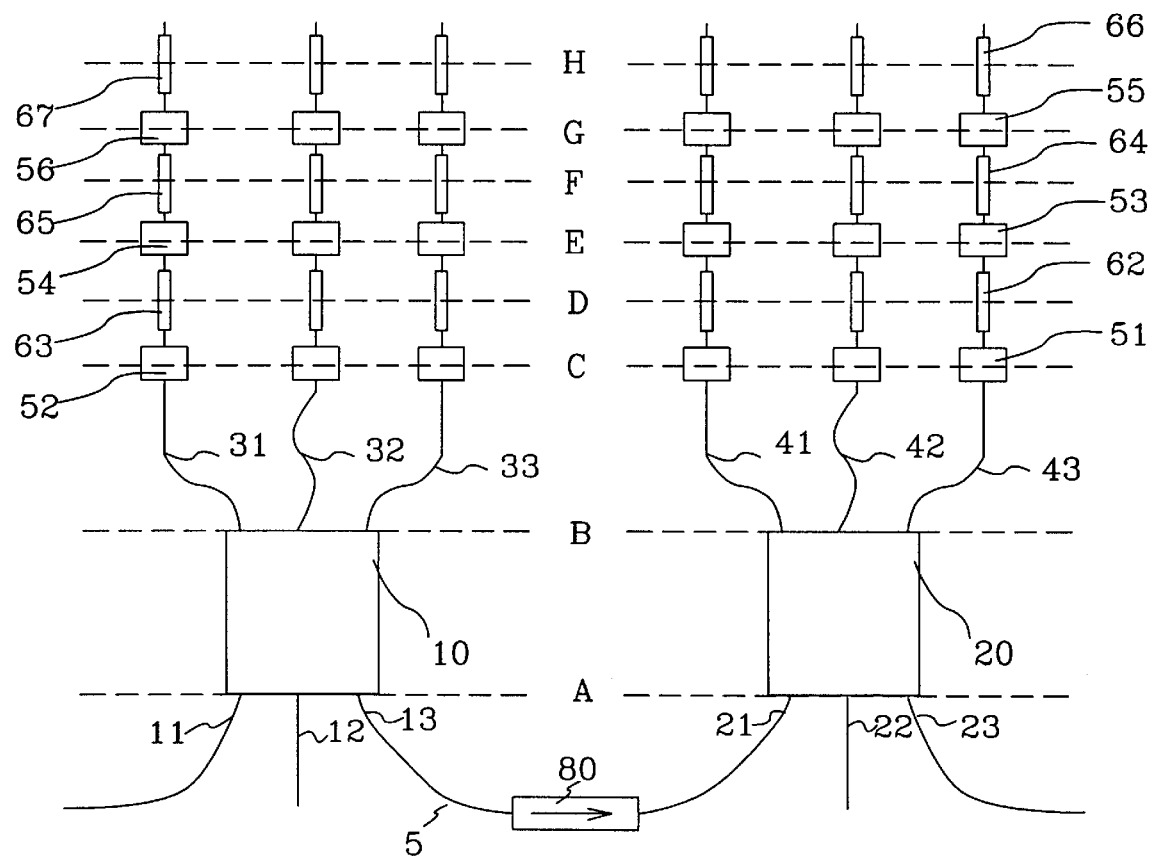
FIG. 2 illustrates another embodiment of an inventive tuneable add/drop multiplexer.

FIG. 2 illustrates another embodiment of a tuneable add/drop multiplexer according to the invention. The support lines A-H show sections used to describe the invention. This embodiment includes two MMI-waveguides 10 and 20, six Michelson waveguides 31, 32, 33, 41, 42 and 43, six access waveguides 11, 12, 13, 21, 22 and 23, a connecting waveguide 5, an isolator 80, eighteen Bragg gratings 62, 63, 64, 65, 66 and 67, and eighteen phase control elements 51, 52, 53, 54, 55 and 56. Only twelve phase control elements are required in principle, since one Michelson waveguide per MMI-waveguide may be without a phase control element.

Three access waveguides 11, 12 and 13 are arranged on the first side of the MMI-waveguide 10. The Michelson waveguides 31, 32 and 33 are arranged on the opposite side relative to said access waveguides 11, 12 and 13. Three Bragg gratings 63, 65 and 67 and three phase control elements 52, 54 and 56 are arranged on each of these Michelson waveguides 31, 32 and 33.

Three access waveguides 21, 22 and 23 are arranged on the first side of the MMI-waveguide 20. The Michelson waveguides 41, 42 and 43 are arranged on the opposite side in relation to said access waveguides 21, 22 and 23. Three Bragg gratings 62, 64 and 66 and three phase control elements 51, 53 and 55 are arranged on each of these Michelson waveguides 41, 42 and 43.

The access waveguide 13 arranged on the first side of the first MMI-waveguide 10 is coupled to the access waveguide 21 arranged on the first side of the second MMI-waveguide 20, via a connecting waveguide 5. This connecting waveguide 5 is provided with an isolator 80. The tuneable add/drop multiplexer will also function in the absence of the isolator 80.

Assume that at least one wavelength channel is sent into an access waveguide 11 arranged on the MMI-waveguide 10. This wavelength channel passes through the MMI-waveguide 10. The length and the structure of the MMI-waveguide is chosen so that N-number of images of the light intensity from the access waveguide 11 at section A is reached in the MMI-waveguide along section B. We assume in this case that the length and the structure have been chosen so as to obtain three images. If the access waveguides 11, 12 and 13 have been arranged at the MMI-waveguide 10 correctly, i.e. have been positioned and dimensioned correctly, and if the cross-sectional dimensions and positioning of the Michelson waveguides 31, 32 and 33 have been chosen correctly, a large part of the energy in the images will be coupled to the Michelson waveguides 31, 32 and 33. The maximum energy for these images is <1/N of the energy along section A when perfect uniformity is achieved, in this case thus <⅓ of the energy along section A. This intensity distribution will deviate to a very small extent when light is instead excited from one of the access waveguides 12 or 13 along section A.

Sections along support lines D, F and H denote Bragg grating sections. The Bragg gratings 63, 65 and 67 along respective support lines may be mutually identical. When the Bragg gratings are identical, the grating sections will reflect respective wavelengths along respective support lines for each of the Michelson waveguides 31, 32 and 33. Reflected wavelengths return to the MMI-waveguide 10 with the phase relationship determined by the phase control elements 52, 54 and 56 respectively.

Assume, for instance, that the Bragg grating 63 along section D reflects the wavelength $\lambda 1$ and that the Bragg grating 65 along section F reflects the wavelength $\lambda 2$. The phase control element 52 along section C will then determine which of the access waveguides 11–13 will be the output port for the wavelength $\lambda 1$, the phase control element 54 along section E will determine which of the access waveguides 11–13 will be the output port for the wavelength $\lambda 2$. The same applies along section G, i.e. respective phase control elements 56 along said section will determine which of the access waveguides 11–13 will be the output port for the wavelength $\lambda 3$ that has been reflected by the Bragg grating 67 along section H.

The phase relationship entering the MMI-waveguide 10 in the reverse direction can thus be chosen individually for each wavelength, i.e. each wavelength channel can be given an output independent of other wavelength channels. This naturally presumes that, e.g., the phase control element 54 along section E can compensate for the phase control element 52 along section C, and that the phase control element 56 along section G can compensate for the phase control elements 52, 54 along respective sections C and E. In general, each phase control element shall be able to compensate for the upstream phase control elements in the channel transmission paths along the same Michelson waveguide. Naturally, the phase control element 52 along the support line C will also influence wavelength channels $\lambda 2$ and $\lambda 3$.

This compensation, however, can be easily controlled with the aid of software in accordance with theories that are well known to the person skilled in this art and that do not therefore need to be described in more detail here. If it is not desired to control said compensation with the aid of software, it is possible to extend the phase control elements 52, 54 and 56 successively from section C in a direction towards section G in some suitable way.

The wavelength channel or channels not reflected individually by a Bragg grating will be excited from respective Michelson waveguides 31, 32 and 33.

FIG. 2 illustrates the principle in which Q wavelength channels are handled by two 3×3 MMI-waveguides. Three wavelength channels can be handled individually in this embodiment. In this case, add and drop are performed in separate structures. The MMI structures function as a splitter from the bottom and upwards in accordance with FIG. 2, for both transmission channels and add-channels. The channels are then reflected in respective Bragg grating sections. When the reflected power again reaches the first MMI structure 10 or the second MMI structure 20, the relative phase distribution in the interface between respective Michelson waveguides 31, 32, 33 and 41, 42 and 43 along section B will determine where the power shall be focused along section A for the first MMI-waveguide 10 and the second MMI-waveguide 20 respectively. One of the access waveguides, for instance waveguide 11, functions as a wavelength channel input while the two remaining access waveguides function as wavelength channel outputs, where one of said channels is intended for none or at least one of the drop-wavelength channels. Access waveguide 13 is coupled to access waveguide 21 via a connecting waveguide 5.

The wavelength channel or channels that has or have not been dropped to the access waveguide 12 is/are transmitted through said connecting waveguide 5 to the second MMI-waveguide 20. These wavelength channels pass through the MMI-waveguide 20. The length and the structure of the MMI-waveguide 20 are chosen so that N-number of images of the light intensity from the access waveguide 21 at section A will be achieved in the MMI-waveguide along section B. It is assumed in this case that the length and the structure have been chosen so as to obtain three images. If the access waveguides 21, 22 and 23 have been arranged correctly at the MMI-waveguide 20, i.e. have been correctly dimensioned and positioned, and if the cross-sectional dimensions and positions of the Michelson waveguides 41, 42 and 43 have been correctly chosen, a large part of the energy in the images will be coupled to the Michelson waveguides 41, 42 and 43. The maximum energy for these images is <1/N of the energy along section A when perfect uniformity is achieved, in this case thus <⅓ of the energy along section A. Deviation of this intensity distribution will be very small when light exits instead from one of the access waveguides 22 or 23 along section A.

Sections along support lines D, F and H denote Bragg grating sections. The Bragg gratings 62, 64 and 66 along respective support lines may be mutually identical, in which case the grating sections will reflect respective wavelengths along respective support lines for each of the Michelson waveguides 41, 42 and 43. Reflected wavelengths will return to the MMI-waveguide 20 with the phase relationship determined by the phase control elements 51, 53 and 55.

Assume, for instance, that the Bragg gratings 62 along section D reflect the wavelength $\lambda 1$, and that the Bragg gratings 64 along section F reflect the wavelength $\lambda 2$. The phase control element 51 along section C will then determine which of the access waveguides 21–23 will be the output port for wavelength $\lambda 1$, and the phase control element 53 along section E will determine which of the access waveguides 21–23 will be the output port for the wavelength $\lambda 2$. The same applies along section G, i.e. respective phase control elements 55 along said section will determine which of the access waveguides 21–23 shall be an output port for the wavelength $\lambda 3$ reflected by the Bragg gratings 66 along section H. In practice, this will be either the access waveguide 22 or the access waveguide 23, since the access waveguide 21 of this embodiment is intended for incoming wavelength channels.

The phase relationship entering the MMI-waveguide 20 in the reverse direction can thus be selected individually for each wavelength, that is to say each wavelength channel can be given an output independent of other wavelength channels. This naturally assumes that, for instance, the phase control element 53 along section E can compensate for the phase control element 51 along section C, and that the phase control element 55 along section G can compensate for the phase control elements 51 and 53 along respective sections C and E. In general, each phase control element shall be able to compensate for those control elements that are arranged upstream in the transmission paths of said channels along the same Michelson waveguide.

The phase control element 51 along the support line C will, of course, also influence the wavelength channels $\lambda 2$ and $\lambda 3$. This compensation, however, can be readily controlled with the aid of software in accordance with theories that are well known to the person skilled in this art and that should not therefore need to be described in more detail here. When it is not desired to control said compensation with the aid of software, the phase control elements 51, 53 and 55 can be extended successively from section C in a direction towards section G in some suitable way.

The wavelength channel or channels that is/are not reflected by a Bragg grating will be excited from respective Michelson waveguides 41, 42 and 43.

The isolator 80 is used to isolate the drop channel from the add channel. The invention illustrated in FIG. 2, however, can function in the absence of an isolator 80. One type of isolator that can be used with the invention is described in Electronics Letters, Jun. 19, 1996, Vol. 22, No. 13, pp. 711–713, "Single Mode optical Isolator at 1.3 µm using all fibre components".

Figure 3:
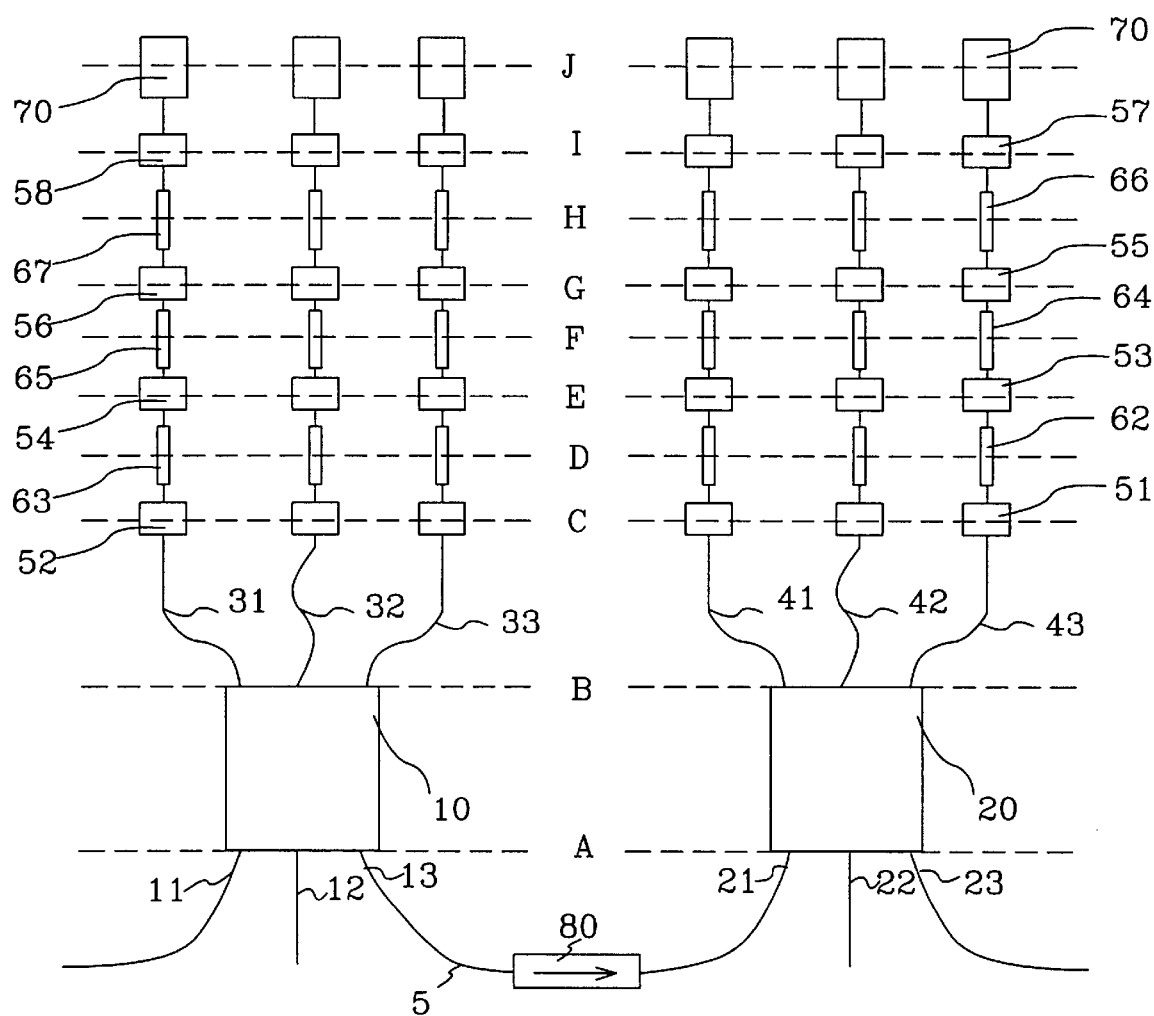
FIG. 3 illustrates a further embodiment of an inventive, tuneable add/drop multiplexer.

FIG. 3 illustrates another embodiment of an inventive tuneable add/drop multiplexer. The support lines A–J show sections that are used to describe the invention. This embodiment includes two MMI-waveguides 10 and 20, six Michelson waveguides 31, 32, 33, 41, 42 and 43, six access waveguides 11, 12, 13, 21, 22 and 23, a connecting waveguide 5, an isolator 80, eighteen Bragg gratings 62, 63, 64, 65, 66 and 67, twenty-four phase control elements 51, 52, 53, 54, 55, 56, 57 and 58, and six broadband reflection gratings 70. In principle, sixteen phase control elements are sufficient, since one Michelson waveguide per MMI-waveguide can manage without a phase control element.

Three access waveguides 11, 12 and 13 are arranged on the first side of the MMI-waveguide 10. Three Michelson waveguides 31, 32 and 33 are arranged on the opposite side in relation to said access waveguides 11, 12 and 13. Three Bragg gratings 63, 65 and 67, four phase control elements 52, 54, 56 and 58, and one broadband reflection grating 70 are arranged on each of said Michelson waveguides 31, 32 and 33.

Three access waveguides 21, 22 and 23 are arranged on the first side of the MMI-waveguide 20, while three Michelson waveguides 41, 42 and 43 are arranged on the opposite side of said MMI-waveguide 20 in relation to said access waveguide 21, 22 and 23. Three Bragg gratings 62, 64 and 66, four phase control elements 51, 53, 55 and 57, and one broadband reflection grating 70 are arranged on each of said Michelson waveguides 41, 42 and 43.

The access waveguide 13 arranged on the first side of the first MMI-waveguide 10 is coupled to the access waveguide 21 on the first side of the second MMI-waveguide 20 via a connecting waveguide 5, said waveguide 5 being provided with an isolator 80.

Assume that at least one wavelength channel is sent into an access waveguide 11 arranged on the MMI-waveguide 10. This wavelength channel passes through the MMI-waveguide. The length and the structure of the MMI-waveguide 10 is chosen so that N-number of images of the light intensity from the access waveguide 11 at section A are obtained in the MMI-waveguide 10 along section B. We assume in this case that the length and the structure have been chosen so that three images will be obtained. If the access waveguides 11, 12 and 13 have been correctly arranged at the MMI-waveguide 10, i.e. have been correctly dimensioned and positioned, and if the cross-sectional dimensions and positioning of the Michelson waveguides 31, 32 and 33 have been chosen correctly, a large part of the energy in the images will be coupled to the Michelson waveguides 31, 32 and 33. The maximum energy for these images is <1/N of the energy along section A when perfect uniformity is obtained, in this case thus <⅓ of the energy along section A. Deviation in this intensity distribution will be very small when light is excited instead from one of the access waveguides 12 or 13 along section A.

Sections along support lines D, F and H denote Bragg grating sections. The Bragg gratings along respective support lines may be mutually identical, in which case the grating sections will reflect respective wavelengths along respective support lines for each of the Michelson waveguides 31, 32 and 33. Reflected wavelengths return to the MMI-waveguide 10 with the phase relationship determined by the phase control elements 52, 54 and 56. Wavelengths that have not been reflected by a Bragg grating along the support lines D, F and H can be reflected by the broadband reflection gratings 70 along section J. The phase control element 58 determines on which access waveguide the wavelengths that have been reflected by the broadband reflection grating will be focused. Assume, for instance, that the Bragg gratings 63 along section D reflect the wavelength $\lambda 1$ and that the Bragg gratings 65 along section F reflect the wavelength $\lambda 2$. The phase control element 52 along section C will then determine which access waveguide 11–13 will be the output port for the wavelength $\lambda 1$, and the phase control element 54 along section E will determine which access waveguide 11–13 will be the output port for the wavelength $\lambda 2$. The same applies along section G, that is to say respective phase control element 56 along said section will determine which access waveguide 11–13 shall be the output port for the wavelength $\lambda 3$ that has been reflected by the Bragg gratings 67 along section H. In the illustrated embodiment, this will be either access waveguide 12 or access waveguide 13 in practice, since access waveguide 11 is intended for incoming wavelength channels.

The phase relationship within the MMI-waveguide 10 in the reverse direction can thus be chosen individually for each wavelength, that is to say each wavelength channel can be given an output independent of other wavelength channels. Naturally, this assumes that, for instance, the phase control element 54 along section E can compensate for the phase control element 52 along section C, and that the phase control element 56 along section G can compensate for the phase control elements 52 and 54 along respective sections C and E. Generally, each phase control element shall be capable of compensating for upstream phase control elements in the transmission paths of said channels along the same Michelson waveguide.

The phase control element 52 along the support line C will, of course, also influence the wavelength channels $\lambda 2$ and $\lambda 3$. This compensation can, however, be readily controlled with software in accordance with theories well known to the person skilled in this art and should therefore not need to be described in more detail here. When it is desired not to control said compensation with the aid of software, the phase control elements 52, 54, 56 and 58 can be extended successively from section C towards section G in some suitable manner.

FIG. 3 illustrates the principle in which Q+Y wavelength channels are handled by two 3×3 MMI-waveguides. Q channels can be dropped and/or added to a channel stream on Q+Y channels. The number of channels Q is restricted solely by the number of separate Bragg gratings and phase control elements. The Y wavelength channels that are not reflected individually are reflected in the broadband reflection section 70 and controlled by the forwardly lying phase control elements. The illustrated embodiment is able to handle individually three wavelength channels. In this case, add and drop are performed in separate structures. The MMI structures 10 and 20 function as a splitter from below and upwards in accordance with FIG. 3, for both transmission channels and add-channels. The channels are then reflected in respective Bragg grating sections. When the reflected power again reaches the first MMI structure 10 and the second MMI structure 20 respectively, the relative phase distribution in the interface between the Michelson waveguides along section B will determine where the power will be focused along section A for the first MMI-waveguide 10 and for the second MMI-waveguide 20. One of the access waveguides, for instance waveguide 11, arranged on the MMI-waveguide 10 will function as a wavelength channel input while the remaining two access waveguides will function as wavelength channel outputs, where one of these is intended for no or at least one drop-wavelength channel. Access waveguide 13 is coupled to access waveguide 21 via a connecting waveguide 5.

The wavelength channel or wavelength channels that has/have not been dropped to the access waveguide 12 is/are transmitted through said connecting waveguide 5 to the second MMI-waveguide 20. Said wavelength channel or channels passes/pass through the MMI-waveguide 20. The length and the structure of the MMI-waveguide are chosen so that N-number of images of the light intensity from the access waveguide 21 at section A will be obtained in the MMI-waveguide along section B. We assume in this case that the length and the structure have been chosen so that three images are obtained. If the access waveguides 21, 22 and 23 have been correctly arranged at the MMI-waveguide 20, in other words have been positioned correctly, and if the cross-sectional dimensions and positions of the Michelson waveguides 41, 42 and 43 have been chosen correctly, a large part of the energy in the images will be coupled to the Michelson waveguides 41, 42 and 43. The maximum energy for these images is <1/N of the energy along section A when perfect uniformity is achieved, in this case thus <⅓ of the energy along section A. Deviation in this intensity distribution will be very small when light is excited instead from either the access waveguide 22 or the access waveguide 23 along section A.

Sections along support lines D, F and H denote Bragg grating sections. The Bragg gratings along respective support lines can be mutually identical, in which case they will reflect respective wavelengths along respective support lines for each of the Michelson waveguides 41, 42 and 43. Reflected wavelengths return to the MMI-waveguide 20 with the phase relationship determined by the phase control elements 51, 53, 55 and 57.

Assume, for instance, that the Bragg grating 62 along section D reflects the wavelength λ1 and that the Bragg grating 64 along section F reflects the wavelength λ2. The phase control element 51 along section C will then determine which of the access waveguides 21–23 will be the output port for the wavelength λ1, while the phase control element 53 along section E will determine which of the access waveguides 21–23 will be the output port for the wavelength λ2. The same applies along section G, which means that respective phase control element 55 along said section will determine which of the access waveguides 21–23 will be the output port for the wavelength λ3 that has been reflected by the Bragg grating 65 along section H.

The phase relationship entering the MMI-waveguide 20 in the reverse direction can thus be chosen individually for each wavelength, i.e. wavelength channels can be given an output independent of other wavelength channels. Naturally, this presumes that, e.g., the phase control element 53 along section E can compensate for the phase control element 51 along section C, and that the phase control element 55 along section G can compensate for the phase control elements 51 and 53 along respective sections C and E. Generally, each phase control element shall be able to compensate for upstream phase control elements in the transmission path of the channels along the same Michelson waveguide.

Naturally, the phase control element 51 along the support line C will also influence the wavelength channels λ2 and λ3. This compensation, however, can be readily controlled with software in accordance with theories that are well known to the person skilled in this art, and should not therefore need to be described in more detail here. If it is not desired to control said compensation with the aid of software, the phase control elements 51, 53, 55 and 57 can be extended successively from section C in a direction towards section G in some suitable way.

The wavelength channel or channels that has/have not been reflected by a Bragg grating can be reflected by the broadband reflection grating 70 arranged at the end of the Michelson waveguides 41, 42 and 43. The broadband reflection gratings can conceivably be arranged at the beginning of the Michelson waveguides 31, 32, 33, 41, 42 and 43. However, the broadband reflection sections must then have openings (windows) for those channels that shall be handled by the Bragg grating sections. An example of one such broadband reflection grating provided with openings is described in G. P. Agrawal and S. Radic, Phase-shifted Fiber Gratings and their Application for Wavelength Demultiplexing, IEEE Photon. Tech. Lett., Vol. 6(8), pp. 995–997, 1994.

The isolator 80 is used to isolate the drop channel from the add channel. The invention illustrated in FIG. 3 can, however, function in the absence of an isolator 80. One type of isolator that can be used in the invention is described in Electronics Letters, Jun. 19, 1996, Vol. 22, No. 13, pp. 711–713, "Single Mode optical Isolator at 1.3 µm using all fibre components".

Figure 4:
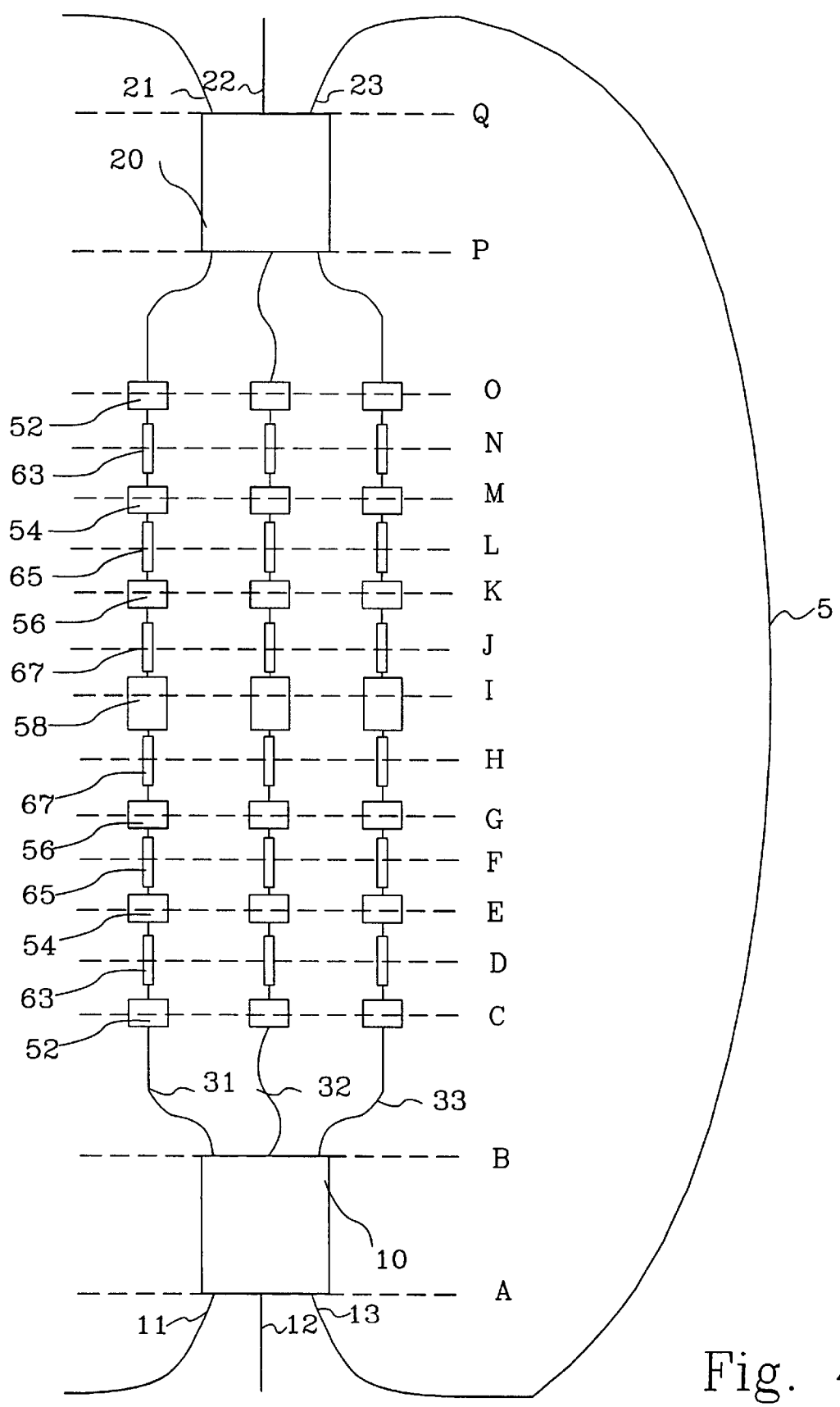
FIG. 4 illustrates still another embodiment of an inventive, tuneable add/drop multiplexer.

FIG. 4 illustrates a further embodiment of an inventive, tuneable add/drop multiplexer. The support lines A–Q show sections that are used to describe the invention. This embodiment includes two MMI-waveguides 10 and 20, three Michelson waveguides 31, 32 and 33, six access waveguides 11, 12, 13, 21, 22 and 23, one connecting waveguide 5, eighteen Bragg gratings 63, 65 and 67, and twenty-one phase control elements 52, 54, 56 and 58. Fourteen phase control elements will suffice in principle, since one Michelson waveguide can manage without phase control elements.

Three access waveguides 11, 12 and 13 are arranged on the first side of the MMI-waveguide 10 and three Michelson waveguides 31, 32 and 33 are arranged on the opposite side of said MMI-waveguide in relation to said access waveguides. Six Bragg gratings 63, 65 and 67 and seven phase control elements 52, 54, 56 and 58 are arranged on each of these Michelson waveguides 41, 32 and 33.

Three access waveguides 21, 22 and 23 are arranged on the first side of the MMI-waveguide 20. The Michelson waveguides 31, 32 and 33 including said Bragg gratings 63, 65 and 67 and said phase control elements 52, 54, 56 and 58 are arranged on said Michelson waveguides 31, 32 and 33 on the opposite side of said MMI-waveguide 20 in relation to said access waveguides.

The access waveguide 13 arranged on the first side of the first MMI-waveguide 10 is coupled to the access waveguide 23 on the first side of the second MMI-waveguide via a connecting waveguide 5.

In the FIG. 4 embodiment, the Bragg grating sections D, F and H and the phase control sections C, E and G are mirror images around section I of the Bragg grating sections N, L and J and the phase control sections O, M and K. It is also conceivable that the phase control sections and Bragg grating sections respectively are not in the same order as seen from the two MMI-waveguides up to the phase control section I, i.e. when the Bragg grating section C reflects a wavelength λ1, the Bragg grating section N, for instance, can reflect either the wavelength λ2 or the wavelength λ3. If the Bragg grating section F reflects a wavelength λ2, the Bragg grating section L can reflect a wavelength λ1 or λ3, and when the Bragg grating section H reflects a wavelength λ3, the Bragg grating section J can reflect a wavelength λ1 or λ2.

Assume that a wavelength channel is sent into the access waveguide 11 on the MMI-waveguide 10. This wavelength channel passes through the MMI-waveguide 10. The length and the structure of the MMI-waveguide 10 are chosen so that N-number of images of the light intensity from the access waveguide 11 at section A will be obtained in the MMI-waveguide 10 along section B. We assume in this case that the length and the structure have been chosen so as to obtain three images. If the access waveguides 11, 12 and 13 have been correctly arranged at the MMI-waveguide 10, i.e. have been correctly dimensioned and positioned, and if the cross-sectional dimensions and positions of the Michelson waveguides 31, 32 and 33 have been chosen correctly, a large part of the energy in the images will be coupled to the Michelson waveguides 31, 32 and 33. The maximum energy for these images is <1/N of the energy along section A when perfect uniformity is obtained, in this case thus <⅓ of the energy along section A. Deviation in this intensity distribution will be very small when light is excited instead from one of the access waveguides 12 or 13 along section A.

Sections along support lines D, F, H, J, L and N denote Bragg grating sections. The Bragg gratings along respective support lines may be mutually identical, in which case the grating sections will reflect respective wavelengths along respective support lines for each of the Michelson waveguides 31, 32 and 33. Wavelengths that arrive from the MMI-waveguide 10 and are reflected by the Bragg gratings 63, 65 and 67 along respective sections D, F and H return to the MMI-waveguide 10 with the phase relationship determined by the phase control elements 52, 54 and 56 along respective sections C, E and G. The wavelengths arriving from the MMI-waveguide 20 and reflected by the Bragg gratings 63, 65 and 67 along respective sections N, L and J return to the MMI-waveguide 20 with the phase relationship determined by the phase control elements 52, 54 and 56 along respective section O, M and K. Transmitting wavelengths that are not reflected by Bragg gratings 63, 65 or 67 are controlled by the phase control element 58 along section I in respect of wavelengths that arrive both from the MMI-waveguide 10 and the MMI-waveguide 20.

Assume, for instance, that the Bragg gratings along sections D and N reflect the wavelength λ1 and that the Bragg gratings along sections F and L reflect the wavelength λ2. The phase control element 52 along respective sections C and O will then determine which of the waveguides 11–13 and 21–23 respectively will be the output port for the wavelength λ1, while the phase control elements 54 along respective sections E and M will determine which of the access waveguides 11–13 and 21–23 respectively will be the output port for the wavelength λ2. The same applies along sections G and K, i.e. respective phase control elements 56 along said sections will determine which of the respective waveguides 11–13 and 21–23 will be the output port for the wavelength λ3 that has been reflected by the Bragg gratings along sections H and J.

The phase relationship entering the MMI-waveguides 10 and 20 in the reverse direction can thus be chosen individually for each wavelength, i.e. each wavelength channel can be given an output independent of other wavelength channels. This presumes, of course, that, e.g., the phase control element 54 along respective sections E and M can compensate for the phase control element 52 along respective sections C and O, and that the phase control element 56 along respective sections G and K can compensate for the phase control elements 52 and 54 along sections C and E and along sections O and M respectively. Generally, each phase control element shall be able to compensate for upstream phase control elements in the transmission paths of the channels along the same Michelson waveguide.

Naturally, the phase control element 52 along respective support lines C and O will also influence the wavelength channels λ2 and λ3. This compensation, however, can be readily controlled with software in accordance with theories well known to the person skilled in this art and should not therefore need to be described in more detail here. If it is not desired to control said compensation with software, the phase control elements 52, 54 and 56 can be extended from section C in a direction towards section A and from section O in a direction towards section K respectively, in some suitable manner.

FIG. 4 illustrates the principle in which Q+Y wavelength channels are handled by two 3×3 and MMI-waveguides. Q channels can be dropped and/or added separately to a channel stream on Q+Y channels. The number of channels Q+Y is restricted solely by the bandwidth of the MMI-waveguides 10 and 20. The number of channels Q is restricted by the number of Bragg gratings 63, 64 and 67 and phase control sections 52, 54 and 56. The non-reflected wavelength channels Y are transmitted from the access waveguide 11 through the MMIMZI structure and controlled to the access waveguide 21 with the phase control section I between the mutually identical reflection sections D–H and N–J respectively. Three wavelength channels can be handled individually in the illustrated embodiment.

The wavelength channel or channels that has/have not been dropped to the access waveguide 12, is/are transmitted through said connecting waveguide 5 to the second MMI-waveguide 20. These wavelength channels pass through the MMI-waveguide 20. The length and the structure of the MMI-waveguide are chosen so that N-number of images of light intensity from the access waveguide 23 at section Q will be obtained in the MMI-waveguide along section P. We assume in this case that the length and the structure is chosen so that three images are obtained. If the access waveguides 21, 22 and 23 have been arranged correctly at the MMI-waveguide 20, i.e. have been correctly positioned, and if the cross-sectional dimensions and positions of the Michelson waveguides 31, 32 and 33 have been correctly chosen, a large part of the energy in the images will be coupled to the Michelson waveguides 31, 32 and 33. The maximum energy for these images is <1/N of the energy along section K when perfect uniformity is achieved, in this case thus <⅓ of the energy along section K. Deviation of this intensity distribution will be very small when light is excited instead from one of the access waveguides 21 or 22 along section Q.

Sections along support lines N, L and J denote Bragg grating sections. The Bragg gratings along respective support lines may be mutually identical, in which case the grating sections will reflect respective wavelengths along respective support lines for each of the Michelson waveguides 31, 32 and 33. Reflected wavelengths return to the MMI-waveguide 20 with the phase relationship determined by the phase control elements 52, 54 and 56.

Assume, for instance, that the Bragg gratings along section J reflect the wavelength λ3, and that the Bragg gratings along section L reflect the wavelength λ2. The phase control element 56 along section K will then determine which access waveguide 21–23 will be the output port for the wavelength λ3, and the phase control element 54 along section M will determine which access waveguide 21–23 will be the output port for the wavelength λ2. The same applies along section O, i.e. respective phase control element 52 along said section will determine which access waveguide 21–23 will be the output port for the wavelength λ1, which has been reflected by the Bragg gratings along section N.

The phase relationship entering the MMI-waveguide 20 in the reverse direction can thus be chosen individually for each wavelength, i.e. each wavelength channel can be given an output independent of other wavelength channels. This, of course, presumes that, e g, the phase control element 54 along section M can compensate for the phase control element 52 along section O, and that the phase control element 56 along section K can compensate for the phase control elements 52 and 54 along respective section O and M. Generally, each phase control element shall be able to compensate for upstream phase control elements in the transmission paths of the channels along the same Michelson waveguide.

The wavelength channel or channels that are excited into the access waveguide 11 and not reflected by a Bragg grating are led to the access waveguide 21 arranged on the first side of the second MMI-waveguide 20.

Figure 5:
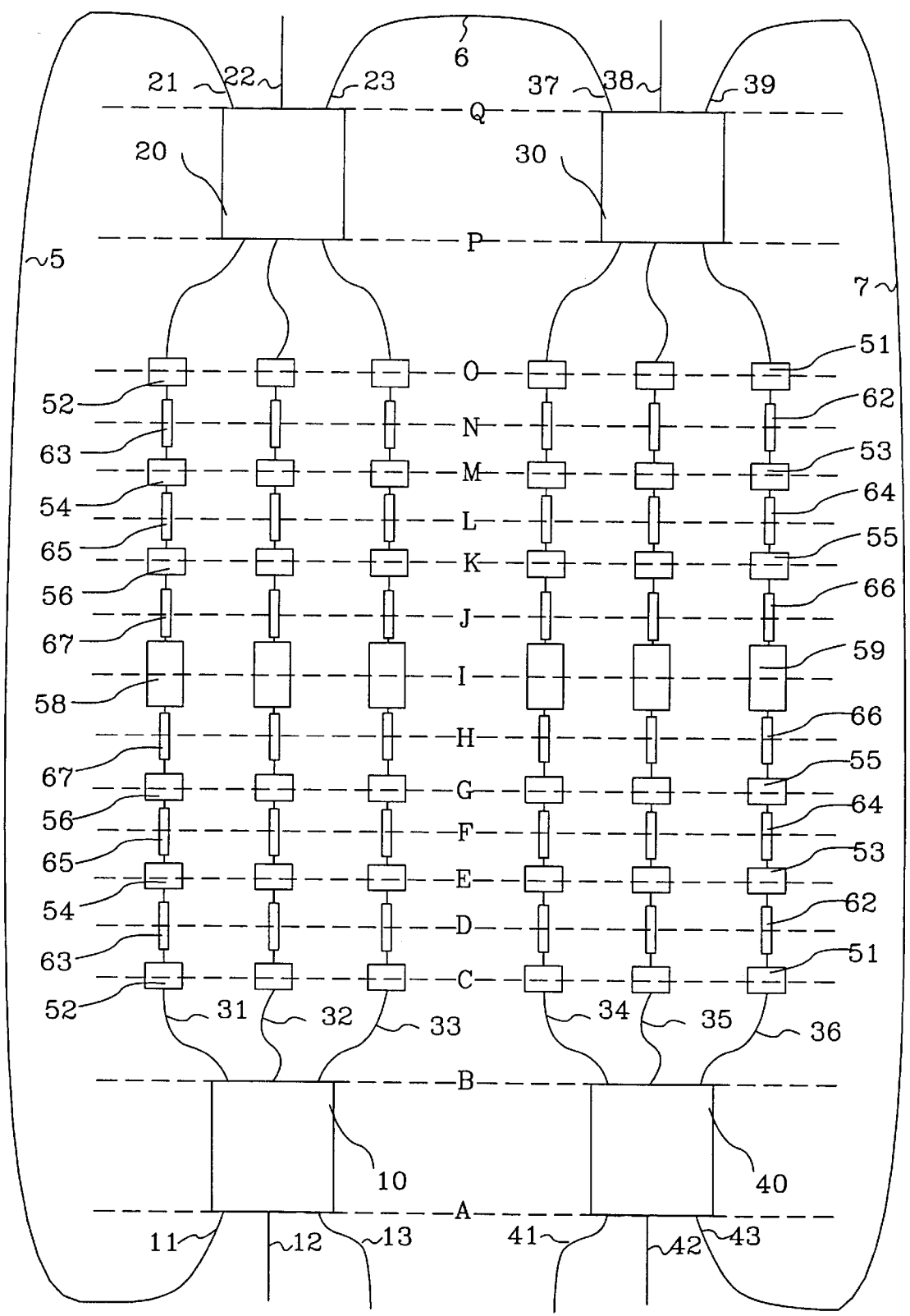
FIG. 5 illustrates still another embodiment of an inventive, tuneable add/drop multiplexer, which can be considered as a series-coupling (cascade coupling) of the configuration according to FIG. 4.

FIG. 5 illustrates yet another embodiment of an inventive tuneable add/drop multiplexer. The support lines A–Q show sections used to describe the invention. This embodiment includes four MMI-waveguides 10, 20, 30 and 40, six Michelson waveguides 31, 32, 33, 34, 35 and 36, twelve access waveguides 11, 12, 13, 21, 22, 23, 37, 38, 39, 41, 42 and 43, three connecting waveguides 5, 6 and 7, thirty-six Bragg gratings 62, 63, 64, 65, 66 and 67, and forty-two phase control elements 51, 52, 53, 54, 55, 56, 57 and 58. Twenty-eight phase control elements will suffice in principle, since one of the Michelson waveguides 31, 32 or 33 and one of the Michelson waveguides 34, 35 or 36 are able to manage completely without phase control elements.

Three access waveguides 11, 12 and 13 are arranged on the first side of a first MMI-waveguide 10, while three Michelson waveguides 31, 32 and 33 are arranged on the other side relative to said access waveguides. Six Bragg gratings 63, 65, 67 and seven phase control elements 52, 54, 56 and 58 are arranged on each of these Michelson waveguides 31, 32 and 33.

Three access waveguides 21, 22 and 23 are arranged on the first side of a second MMI-waveguide 20, while said Michelson waveguides 31, 32 and 33 that include said six Bragg gratings 63, 65, 67 and said seven phase control elements 52, 54, 56 and 58 are arranged on the opposite side relative to said access waveguides.

The access waveguide 11 arranged on the first side of the first MMI-waveguide 10 is coupled to the access waveguide 21 on the first side of the second MMI-waveguide via a connecting waveguide 7.

Three access waveguides 37, 38 and 39 are arranged on the first side of a third MMI-waveguide, and three Michelson waveguides 34, 35 and 36 are arranged on the opposite side relative to said access waveguides. Arranged on each of these Michelson waveguides 34, 35 and 36 are six Bragg gratings 62, 64, 66 and seven phase control elements 51, 53, 55 and 59.

Three access waveguides 41, 42 and 43 are arranged on the first side of a fourth MMI-waveguide 40, while said Michelson waveguides 34, 35 and 36 that include said six Bragg gratings 62, 64, 66 and said seven phase control elements 51, 53, 55 and 59 are arranged on the opposite side relative to said access waveguides 41, 42 and 43.

A third access waveguide 23 arranged on the first side of the second MMI-waveguide 20 is coupled to a first access waveguide 37 arranged on the first side of the third MMI-waveguide, via a connecting waveguide 6. A third access waveguide 39 arranged on the first side of the third MMI-waveguide 30 is coupled to a third access waveguide 43 arranged on the first side of the fourth MMI-waveguide 40, via a connecting waveguide 5.

In the FIG. 5 embodiment, the Bragg gratings 63, 65 and 67 and the phase control elements 52, 54 and 56 along respective sections D, F and H and C, E and G are a mirror image around section I of the Bragg gratings 52, 54 and 56 and phase control elements 63, 65 and 67 along respective sections N, L and J and O, M and K. In other words, the Bragg gratings 63 reflect a wavelength λ1, the Bragg gratings 65 reflect a wavelength λ2, and the Bragg gratings 67 reflect a wavelength λ3. It is conceivable that the Bragg gratings along the sections D and N, F and L, and H and J respectively will not reflect the same wavelengths. If the Bragg gratings 63 along section D reflect a wavelength λ1, the Bragg gratings 63 along section N may reflect a wavelength λ2 or λ3. If the Bragg gratings 65 along section F reflect a wavelength λ2, the Bragg gratings 65 along section L may reflect a wavelength λ1 or λ3, and if the Bragg gratings 67 along section H reflect a wavelength λ3, the Bragg gratings 67 along section J may reflect a wavelength λ1 or λ2.

In the FIG. 5 embodiment, the Bragg gratings 62, 64 and 66 and the phase control elements 51, 53 and 55 along respective sections D, F, H and C, E, G are a mirror image around section I of the Bragg gratings 62, 64 and 66 and the phase control elements 51, 53 and 55 along respective section N, L, J and O, M, K. In other words, the Bragg gratings 62 reflect a wavelength λ4, the Bragg gratings 64 reflect a wavelength λ5, and the Bragg gratings 66 reflect a wavelength λ6. Conceivably, the Bragg gratings along respective sections D and N, F and L, H and J will not reflect the same wavelengths. If the Bragg gratings 62 along section D reflect a wavelength λ4, the Bragg gratings 62 along section N may reflect a wavelength λ5 or λ6. If the Bragg gratings 64 along section F reflect a wavelength λ5, the Bragg gratings 64 along section L may reflect a wavelength λ4 or λ6, while if the Bragg gratings 66 along section H reflect a wavelength λ6, the Bragg gratings 66 along section J may reflect a wavelength λ4 or λ5.

The Bragg gratings 63, 65 and 67 preferably reflect other wavelengths than the Bragg gratings 62, 64 and 66, in other words when the Bragg gratings 63, 65 and 67 reflect the wavelengths λ1–λ3, the Bragg gratings 62, 64 and 66 will reflect the wavelengths λ4–λ6.

The phase control elements 58 and 59 can control those wavelengths that are not reflected individually by a Bragg grating.

Assume that at least one wavelength channel is excited into the access waveguide 13 arranged on the MMI-waveguide 10. This wavelength channel passes through the MMI-waveguide 10. The length and the structure of the MMI-waveguide 10 are chosen so as to obtain N-number of images of the light intensity from the access waveguide 13 at section A in the MMI-waveguide 10 along section B. We assume in this case that the length and structure have been chosen so as to obtain three images. If the access waveguides 11, 12 and 13 have been arranged correctly at the MMI-waveguide 10, i.e. have been correctly positioned and dimensioned, and if the cross-section dimensions and positions of the Michelson waveguides 31, 32 and 33 have been correctly chosen, a large part of the energy in the images will be coupled to the Michelson waveguides 31, 32 and 33. The maximum energy for these images is <1/N of the energy along section A if perfect uniformity is achieved, in this case thus <⅓ of the energy along section A. Deviation of this intensity distribution will be very slight when the light is excited? instead from one of the access waveguides 11 or 12 along section A.

Sections along support lines D, F and H denote Bragg grating sections. The Bragg gratings 63, 65 and 67 along said support lines may be mutually identical, in which case said grating sections will reflect respective wavelengths that arrive from the MMI-waveguide 10 along respective support lines for each of the Michelson waveguides 31, 32 and 33. Reflected wavelengths return to the MMI-waveguide 10 with the phase relationship determined by the phase control elements 52, 54 and 56.

Assume, for instance, that the Bragg grating 63 along section D reflects the wavelength λ1, and the Bragg grating 65 along section F reflects the wavelength λ2. The phase control elements 52 along section C will then determine which access waveguide 11–13 will be the output port for the wavelength λ1, and the phase control elements 54 along section E will determine which access waveguide 11–13 will be the output port for the wavelength λ2. The same applies along section G, i.e. respective phase control elements 56 along said section determine which of the access waveguides 11–13 shall be the output port for the wavelength λ3 that has been reflected by the Bragg gratings 67 along section H.

The phase relationship entering the MMI-waveguide 10 in the reverse direction can thus be chosen individually for each wavelength, in other words each wavelength channel can be given an output independent of other wavelength channels. This naturally assumes that, e.g., the phase control element 54 along section E can compensate for the phase control element 52 along section C, and that the phase control element 56 along section G can compensate for the phase control elements 52 and 54 along respective sections C and E. Generally, each phase control element shall be able to compensate for upstream phase control elements in the transmission paths of the channels along the same Michelson waveguide.

Naturally, the phase control element 52 along the support line C will also influence the wavelength channels λ2 and λ3. This compensation, however, can be readily controlled with software in accordance with theories that are well known to one skilled in this art and should not therefore need to be described in more detail here. If it is not desired to control said compensation with the aid of software, the phase control elements 52, 54 and 56 can be extended successively from section C towards section G in some suitable way.

The access waveguide 11 is coupled to the access waveguide 21 via the connecting waveguide 7. The wavelength channel or channels that has/have been reflected and not dropped to the access waveguide 12 is/are transmitted out through the access waveguide 11 and through said connecting waveguide 7 to the access waveguide 21 arranged on the second MMI-waveguide 20. These wavelength channels pass through the MMI-waveguide 20. The length and structure of the MMI-waveguide have been chosen so as to obtain in the MMI-waveguide along section P N-number of images of the light intensity from the access waveguide 21 at section Q. We assume in this case that the length and structure have been chosen so as to obtain three images. If the access waveguides 21, 22 and 23 have been correctly arranged at the MMI-waveguide 20, i.e. correctly positioned and dimensioned, and if the cross-sectional dimensions and positions of the Michelson waveguides 31, 32 and 33 have been chosen correctly, a large part of the energy in the images will be coupled to the Michelson waveguide 31, 32 and 33. The maximum energy for these images is <1/N of the energy along section Q if perfect uniformity is achieved, in this case thus <⅓ of the energy along section Q. Deviation of this intensity distribution will be very small when light is instead excited from one of the access waveguides 22 or 23 along section Q.

Sections along support lines N, L and J denote Bragg grating sections. Bragg gratings 63, 65 and 67 along respective support lines may be mutually identical, in which case the grating sections will reflect respective wavelengths along respective support lines for each of the Michelson waveguides 31, 32 and 33. Reflected wavelengths will return to the MMI-waveguide 20 with the phase relationship determined by the phase control elements 52, 54 and 56.

Assume, for instance, that the Bragg gratings 63 along section N reflect the wavelength λ1 and that the Bragg gratings 65 along section L reflect the wavelength λ2. The phase control elements 52 along section O will then determine which access waveguide 21–23 will be the output port for the wavelength λ1, and the phase control element 54 along section M will determine which access waveguide 21–23 will be the output port for the wavelength λ2. The same applies along section K, in other words respective phase control element 56 along said section determine which access waveguide 21–23 will be the output port for the wavelength λ3 that has been reflected by the Bragg gratings along section J.

The phase relationship entering the MMI-waveguide 20 in the reverse direction can thus be selected individually for each wavelength, which means that each wavelength channel can be given an output independent of other wavelength channels. This naturally presumes that, e.g., the phase control element 54 along section M can compensate for the phase control element 52 along section O, and that the phase control element 56 along section K can compensate for the phase control elements 52 and 54 along respective section O and M. Generally, each phase control element shall be able to compensate for the upstream phase control elements in the transmission paths along the same Michelson waveguide.

Naturally, the phase control element 52 along the support line O will also influence the wavelength channels λ2 and λ3. This compensation, however, can be readily controlled by software in accordance with theories that are well known to the person skilled in this art and should not therefore need to be described in more detail here. If it is not desired to control said compensation with the aid of software, the phase control elements 52, 54 and 56 can be extended successively from section O in a direction towards section K in some suitable manner.

The wavelength channel or channels that has/have been excited into the access waveguide 13 and has/have not been reflected by a Bragg grating will be focused with the aid of the phase control element 58 along section I on the access waveguide 23 arranged on the first side of the second MMI-waveguide 20. These wavelengths together with those wavelengths that have been transmitted through the connecting waveguide 7, plus the add-wavelength channels that have been excited into the access waveguide 22 and which have also been reflected by a Bragg grating 63, 65 or 66 along sections N, L and J arranged in the Michelson waveguides 31, 32 and 33, will be focused to the access waveguide 23 arranged on the first side of the second MMI-waveguide 20. The access waveguide 23 is connected with the access waveguide 37 via the connecting waveguide 6. Said wavelength channels are excited into the first access waveguide 37 arranged on the third MMI-waveguide 30.

These wavelength channels pass through the MMI-waveguide 30. The length and the structure of the MMI-waveguide 30 are chosen so that N-number of images of the light intensity from the access waveguide 37 at section Q will be obtained in the MMI-waveguide 30 along section P. We assume in this case that the length and structure have been chosen so as to obtain three images. If the access waveguides 37, 38 and 39 have been correctly arranged at the MMI-waveguide 30, i.e. have been correctly positioned and dimensioned, and if the cross-sectional dimensions and positions of the Michelson waveguides 34, 35 and 36 have been correctly chosen, a large part of the energy in the images will be coupled to the Michelson waveguides 34, 35 and 36. The maximum energy for these images is <1/N of the energy along section Q if perfect uniformity is achieved, in this case thus <⅓ of the energy along section Q. Deviation of this intensity distribution will be very small, if light is, instead, excited from one of the access waveguides 38 or 39 along section Q.

Sections along support lines N, L and J denote Bragg grating sections. The Bragg gratings 62, 64 and 66 along respective support lines may be mutually identical, in which case the grating sections will reflect respective wavelengths along respective support lines for each of the Michelson waveguides 34, 35 and 36. Reflected wavelengths will return to the MMI-waveguide 30 with the phase relationship determined by the phase control elements 51, 53 and 55.

Assume, for instance, that the Bragg gratings along section N reflect the wavelength λ4 and that the Bragg gratings along section L reflect the wavelength λ5. The phase control element 51 along section O will then determine which access waveguide 37–39 will be the output port for the wavelength λ4, while the phase control element 53 along section M will determine which access waveguide 37–39 will be the output port for the wavelength λ5. The same applies along section K, i.e. respective phase control element 55 along said section will determine which of the access waveguides 37–39 shall be the output port of the wavelength λ6 that has been reflected by the Bragg gratings along section J.

The phase relationship entering the MMI-waveguide 30 in the reverse direction can thus be selected individually for each wavelength. In other words, each wavelength channel can be given an output independent of other wavelength channels. This naturally presumes that, e.g., the phase control element 53 along section M can compensate for the phase control element 51 along section O, and that the phase control element 55 along section K can compensate for the phase control elements 51, 53 along respective section O and M. Generally, each phase control element shall be able to compensate for the upstream phase control elements in the transmission paths of the channels along the same Michelson waveguide.

Naturally, the phase control element 51 along the support line O will also influence the wavelength channels λ5 and λ6. However, this compensation can be readily controlled with the aid of software in accordance with theories that are well known to the skilled person in this field, and that should therefore not need to be described in more detail here. If it is not desired to control this compensation with the aid of software, the phase control elements 51, 53 and 55 can be extended successively from section O in a direction towards section K, in a suitable manner.

The wavelength channel or channels that has/have been reflected and not dropped to the access waveguide 38 are transmitted out from the access waveguide 39 arranged on a third MMI-waveguide and pass through said connecting waveguide 5 to the access waveguide 43 on the fourth MMI-waveguide 40. These wavelength channels pass through the MMI-waveguide 40. The length and structure of the MMI-waveguide 40 have been chosen so as to obtain N-number of images of the light intensity from the access waveguide 43 at section A in the MMI-waveguide along section B. We assume in this case that the length and structure have been chosen so as to obtain three images. If the access waveguides 41, 42 and 43 have been correctly arranged at the MMI-waveguide 40, i.e. correctly positioned and dimensioned, and if the cross-sectional dimensions and positions of the Michelson waveguides 34, 35 and 36 have been correctly chosen, a large part of the energy in the images will be coupled to the Michelson waveguides 34, 35 and 36. The maximum energy for these images is <1/N of the energy along section B if perfect uniformity is achieved, in this case thus <⅓ of the energy along section A. Deviation of this intensity distribution will be very small, if light is instead excited? from one of the access waveguides 41 or 42 along section A.

Sections along support lines D, F and H denote Bragg grating sections. The Bragg gratings 62, 64 and 66 along respective support lines may be mutually identical, in which case the grating sections reflect respective wavelengths along respective support lines for each of the Michelson waveguides 34, 35 and 36. Reflected wavelengths return to the MMI-waveguide 40 with the phase relationship determined by the phase control elements 51, 53 and 55.

Assume, for instance, that the Bragg gratings along section D reflect the wavelength λ4, and that the Bragg gratings along section F reflect the wavelength λ5. The phase control elements 51 along section C will then determine which of the access waveguides 41–43 will be the output port for the wavelength λ4, and the phase control element 53 along section E will determine which of the access waveguides 41–43 will be the output port for the wavelength λ5. The same applies along section G, in other words respective phase control elements 55 along said section will determine which of the access waveguides 41–43 will be the output port for the wavelength λ6 that has been reflected by the Bragg grating 66 along section H.

The phase relationship entering the MMI-waveguide 40 in the reverse direction can thus be chosen individually for each wavelength. In other words, each wavelength channel can be given an output independent of other wavelength channels. Naturally, this presumes that, e.g., the phase control element 53 along section E can compensate for the phase control element 51 along section C, and that the phase control element 55 along section G can compensate for the phase control elements 51, 53 along respective sections C and E. Generally, each phase control element shall be able to compensate for the upstream phase control elements in the transmission paths of the channels along the same Michelson waveguide.

The phase control element 51 along the support line C will, of course, also influence the wavelength channels λ5 and λ6. This compensation, however, can be readily controlled with software in accordance with theories which are well known to the person skilled in this art and which therefore need not be described in detail here. If it is not desired to control said compensation with the aid of software, the phase control elements 51, 53 and 55 can be extended successively from section C in a direction towards section G in some suitable manner.

Figure 6:
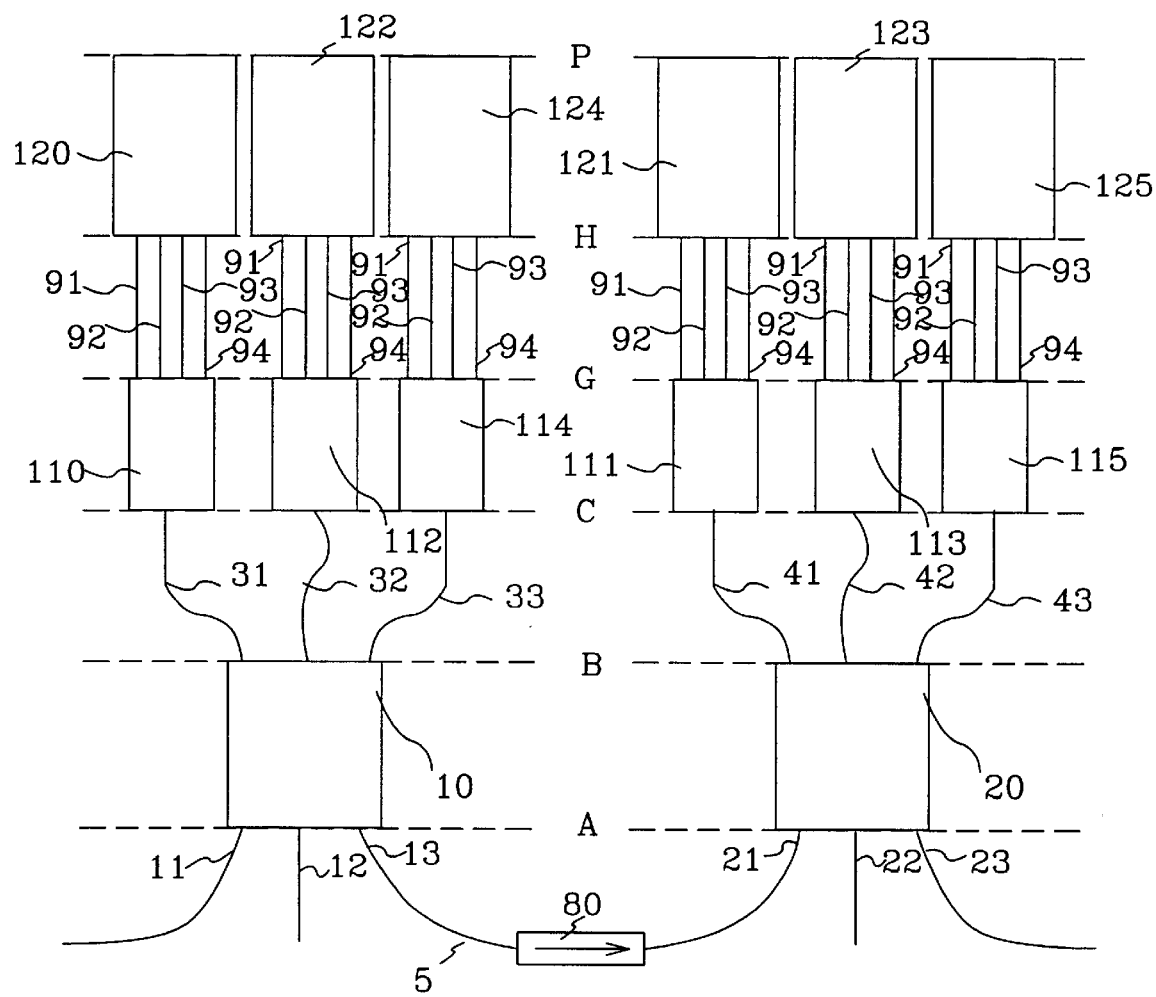
FIG. 6 illustrates another embodiment of an inventive, tuneable add/drop multiplexer.

FIG. 6 illustrates another embodiment of an inventive tuneable add/drop multiplexer. The support lines A–P show sections that are used to describe the invention. This embodiment includes two MMI-waveguides 10 and 20, six Michelson waveguides 31, 32, 33, 41, 42 and 43, six access waveguides 11, 12, 13, 21, 22 and 23, a connecting waveguide 5, an isolator 80, six 1×N switches 110, 111, 112, 113, 114 and 115 and six reflection sections 120, 121, 122, 123, 124 and 125.

Three access waveguides 11, 12 and 13 are arranged on the first side of the MMI-waveguide 10, while three Michelson waveguides 31, 32 and 33 are arranged on the opposite side in relation to said access waveguides 11, 12 and 13. A 1×N switch 110, 112 and 114 and a reflection section 120, 112 and 124 are arranged on each of said Michelson waveguides 31, 32 and 33. Three access waveguides 21, 22 and 23 are arranged on the first side of the MMI-waveguide 20, while three Michelson waveguides 41, 42 and 43 are arranged on the opposite side in relation to said access waveguides 21, 22 and 23. A 1×N switch 111, 113 and 115 and a reflection section 121, 123 and 125 are arranged respectively on each of the Michelson waveguides 41, 42 and 43.

The access waveguide 13 arranged on the first side of the first MMI-waveguide 10 is coupled to the access waveguide 21 on the first side of the second MMI-waveguide 20 via a connecting waveguide 5. This connecting waveguide 5 is provided with an isolator 80.

Assume that at least one wavelength channel is sent into an access waveguide 11 arranged on the MMI-waveguide 10. This wavelength channel passes through the MMI-waveguide. The length and the structure of the MMI-waveguide 10 are chosen so as to obtain N-number of images of the light intensity from the access waveguide 11 at section A in the MMI-waveguide 10 along section B. We assume in this case that the length and the structure have been chosen so as to obtain three images. If the access waveguides 11, 12 and 13 have been correctly arranged at the MMI-waveguide 10, i.e. have been correctly dimensioned and positioned, and if the cross-sectional dimensions and positions of the Michelson waveguides 31, 32 and 33 have been chosen correctly, a large part of the energy in the images will be coupled to the Michelson waveguides 31, 32 and 33. The maximum energy for these waveguides is <1/N of the energy along section A if perfect uniformity is achieved, in this case thus <⅓ of the energy along section A. Deviation in this intensity distribution will be very small if light is, instead, excited from one of the access waveguides 12 or 13 along section A.

Figure 7:
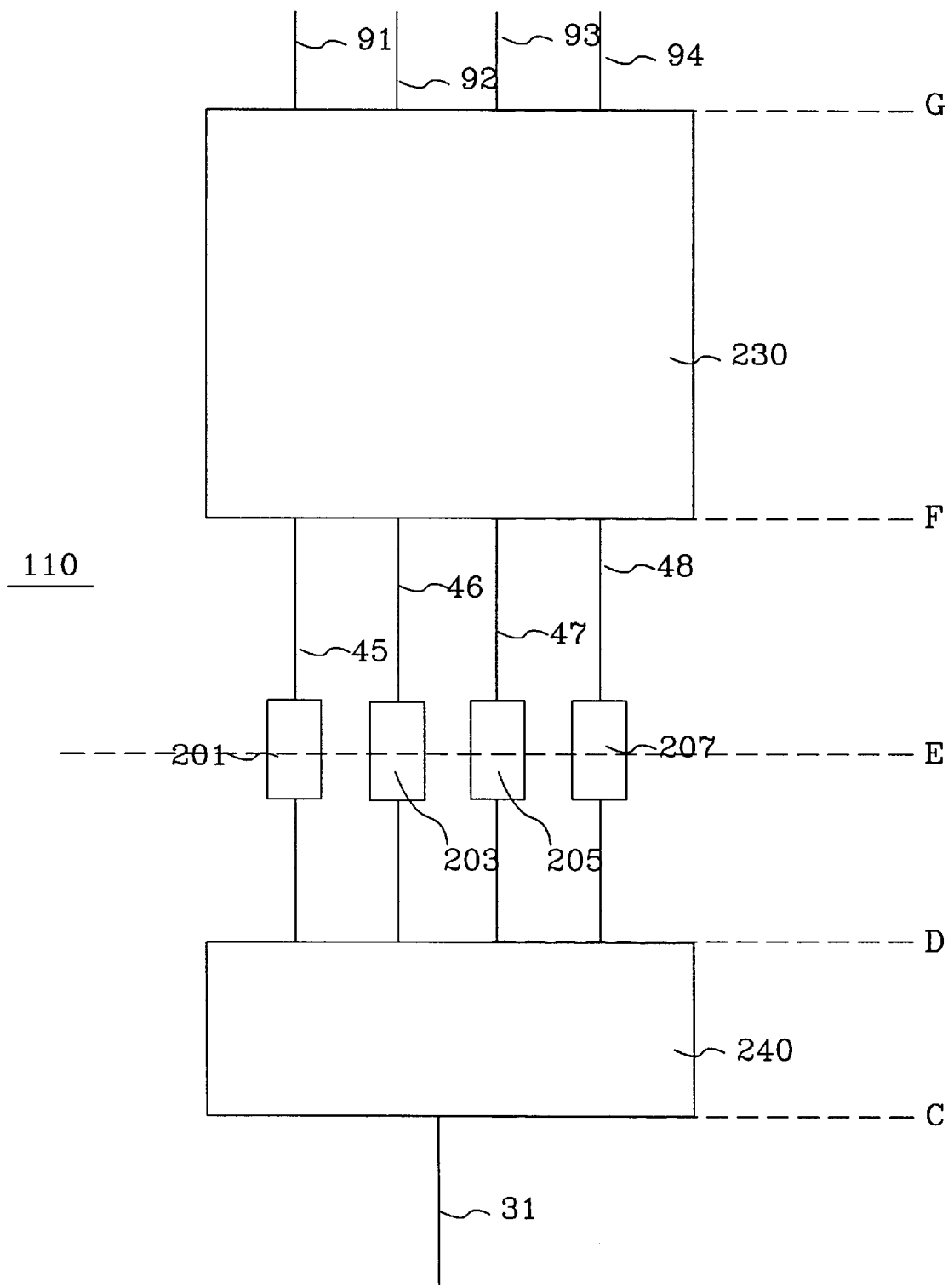
FIG. 7 illustrates an example of an 1×N switch that can be used in the inventive add/drop multiplexer according to FIG. 6.

FIG. 7 illustrates a suitable 1×N switch for use with the inventive embodiment according to FIG. 6. The 1×N switch shown in FIG. 7 is an MMIMZI-based switch (Multi Mode Interference Mach-Zehnder Interferometer). Any 1×N switch whatsoever will be suitable in principle, providing that a reciprocal behaviour exists. A reciprocal 1×N switch is a switch that does not include a reciprocal element. A reciprocal behaviour means that light follows the same path through an element with the same losses regardless of direction.

The 1×N switch, where N=4, in FIG. 7, includes one 1×N MMI-waveguide 240, where N=4, four Mach-Zehnder waveguides 45, 46, 47 and 48, four phase control elements 201, 203, 205 and 207, and one N×N MMI-waveguide 230, where N=4. Arranged on a first side of the 1×4 MMI-waveguide is, for instance, the Michelson waveguide 31. The aforesaid Mach-Zehnder waveguides 45, 46, 47 and 48 including respective phase control elements 201, 203, 205 and 207 are arranged on a second side of said one 4×4 MMI-waveguide. The Mach-Zehnder waveguides are also arranged on a first side of said 4×4 MMI-waveguide 230. Four Michelson waveguides 91, 92, 93 and 94 are arranged on a second side of said 4×4 MMI-waveguide. Three phase control elements will suffice in principle, since one Mach-Zehnder waveguide may be without a phase control element.

The wavelength channels excited out in one of the Michelson waveguides 31, 32 and 33 on the MMI-waveguide 10 first pass slightly therethrough and are thereafter transmitted through the aforesaid 1×N switch. This switch causes the wavelength channels to exit through one of its N-outputs.

Assume that 1×N switches 110, 112 and 114 are set so that the wavelength channels will be excited to the Michelson waveguide 31.

Figure 8:
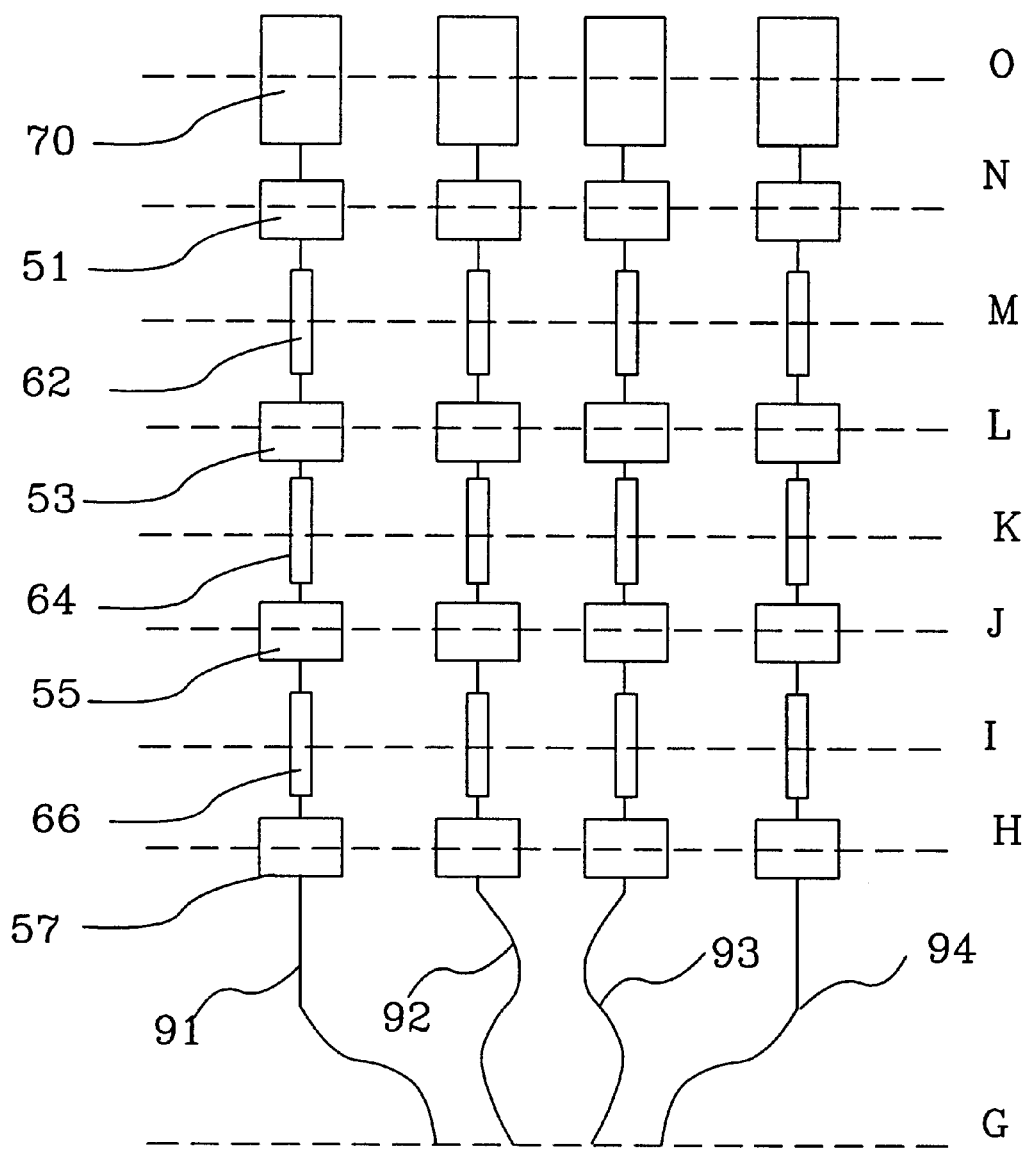
FIG. 8 illustrates an embodiment of a reflection section that can be used in the inventive add/drop multiplexer according to FIG. 6.

As before mentioned, the Michelson waveguides 91, 92, 93 and 94 belonging to the 1×N switches 110, 112 and 114 are provided to the reflection sections 120, 122 and 124. One conceivable reflection section is shown in FIG. 8. Sections along support lines I, K and M denote Bragg grating sections. A broadband reflection grating is arranged in each Michelson waveguide along the section O. The Bragg gratings 62, 64 and 66 along respective support lines M, K and I reflect different wavelengths for the different Michelson waveguides 91, 92, 93 and 94. Reflected wavelengths return to the 1×N switch 110, 112 and 114 and to the MMI-waveguide 10 with the phase relationship determined by the phase control elements 53, 55 and 57. Those wavelengths that have not been reflected by a Bragg grating along the support lines M, K and I can be reflected by the broadband reflection gratings 70 along section O. The access waveguide on which the wavelengths that have been reflected by the broadband reflection grating 70 will be focused is controlled by the phase control element 51.

Assume, for instance, that with respect to the Michelson waveguide 91 the Bragg grating 66 along section I reflects the wavelength λ1 and that the Bragg grating 64 along section K reflects the wavelength λ2. The phase control element 57 along section H will then determine which of the access waveguides 11–13 shall be the output port for the wavelength λ1, and the phase control element 55 along section J will determine which of the access waveguides 11–13 shall become the output port for the wavelength λ2. The same applies along section L, that is to say respective phase control element 53 along said determine which of the access waveguides 11–13 shall be the output port for the wavelength λ3 that has been reflected by the Bragg grating 62 along section M. In the illustrated embodiment, this will concern in practice either the access waveguide 12 or the access waveguide 13, since the access waveguide 11 is intended for incoming wavelength channels.

The phase relationship entering the MMI-waveguide 10 in the reverse direction can thus be chosen individually for each wavelength which is corresponded by a Bragg grating in a Michelson waveguide. In other words, each such wavelength channel can be given an output independent of other wavelength channels. This naturally presumes that, e.g., the phase control element 55 along section J can compensate for the phase control element 57 along section H, and that the phase control element 53 along section L can compensate for the phase control elements 57 and 55 along respective sections H and J. Generally, each phase control element shall be able to compensate for upstream phase control elements in the transmission paths of respective channels along the same Michelson waveguide.

Naturally, the phase control element 57 along the support line H will also influence the wavelength channels λ2 and λ3. This compensation, however, can be readily controlled with software in accordance with theories which are well known to the person skilled in this art and which should therefore not need to be described in detail here. If it is not desired to control said compensation with the aid of software, the phase control elements 57, 55, 53 and 51 can be extended successively from section H in a direction towards section N in some suitable way.

The wavelength channels that are excited out into one of the Michelson waveguides 41, 42 and 43 arranged on the MMI-waveguide 20 first pass slightly therethrough and thereafter arrive at the 1×N switch 111, 113 and 115, where N=4 in this case. The switch causes the wavelength channels to be excited out therefrom through one of its N-outputs.

Assume that the 1×N switches 111, 113 and 115 are set so that the wavelength channels will be sent to the Michelson waveguide 91.

As mentioned above, said Michelson waveguides 91, 92, 93 and 94 are arranged at the reflection sections 121, 123 and 125. Sections along support lines I, K and M denote Bragg grating sections. A broadband reflection grating is arranged along section O for each Michelson waveguide. The Bragg gratings 62, 64 and 66 along respective support lines M, K and I reflect different wavelengths for different Michelson waveguides 91, 92, 93 and 94. Reflected wavelengths return to the 1×N switches 111, 113 and 115 and to the MMI-waveguide 20 with the phase relationship determined by the phase control elements 51, 53, 55 and 57.

Assume, for instance, that with respect to the Michelson waveguide 91 for each of the reflection sections 121, 123 and 125, the Bragg gratings 66 along section I reflect the wavelength λ1 and that the Bragg gratings 64 along section K reflect the wavelength λ2. The phase control elements 57 along section H will then determine which of the access waveguides 21–23 will become the output port for the wavelength λ1, while the phase control element 55 along section J will determine which of the access waveguides 21–23 will be the output port for the wavelength λ2. The same applies along section L, i.e. the phase control elements 53 along section L will determine which of the access waveguides 21–23 shall be the output port for the wavelength λ3 that has been reflected by the Bragg grating 62 along the section M.

The Figure shows the MMI-waveguide 10 with associated switches 110, 112 and 114 and the reflection sections 120, 122 and 124 as the drop-part of the tuneable add/drop multiplexer, and the MMI-waveguide 20 with associated switches 111, 113 and 115 and the reflection sections 121, 123 and 125 as the add-part of said multiplexer. From a wavelength channel stream excited into the access waveguide 11, one or more wavelength channels can be dropped to the access waveguide 12 arranged on the MMI-waveguide 10. One or more channels can be added to said wavelength channels, by exciting said channels into the access waveguide 22 arranged on the MMI-waveguide 20.

The phase relationship entering the MMI-waveguide 20 in the reverse direction can thus be chosen individually for each wavelength corresponded by some Bragg grating in a Michelson waveguide. In other words, each such wavelength channel can be given an output independent of other wavelength channels. This naturally presumes that, e.g., the phase control element 55 along section J can compensate for the phase control element 57 along section H, and that the phase control element 53 along section L can compensate for the phase control elements 55 and 57 along respective sections J and H. Generally, each phase control element shall be able to compensate for the upstream phase control elements in the transmission paths of the channels along the same Michelson waveguide.

Naturally, the phase control element 57 along the support line H will also influence the wavelength channels λ5 and λ6. This compensation, however, can be readily controlled with software in accordance with theories which are well known to the person skilled in this art and which should therefore not need to be described in more detail here. If it is not desired to control said compensation with the aid of software, the phase control elements 57, 55, 53 and 51 can be extended successively from section H in a direction towards section N.

Preferably, the reflection sections 120, 122 and 124 will be identical, and preferably the reflection sections 121, 123 and 125 will also be identical.

The wavelength channel or channels that has/have not been reflected by a Bragg grating can be reflected by the broadband reflection grating 70 arranged at the end of the Michelson waveguides 91, 92, 93 and 94. It is conceivable for the broadband reflection gratings to be arranged at the beginning of respective Michelson waveguides 91, 92, 93 and 93. In this case, however, the broadband reflection sections must include openings (windows) for those channels that shall be handled by the Bragg grating sections. An example of one such broadband reflection grating provided with openings is described in G.P. Agrawal and S. Radic, Phase-shifted Fiber Gratings and their Application for Wavelength Demultiplexing, IEEE Photon. Tech. Lett., Vol. 6(8), pp. 995–997, 1994. FIG. 6 illustrates the principle in which Q+Y wavelength channels are handled by two 3×3 MMI-waveguides. Q channels can be dropped and/or added to a channel stream of Q+Y channels. The number of channels Q is restricted solely by the number of separate Bragg gratings and phase control elements in respective Michelson waveguides. The Y wavelength channels not reflected individually are reflected in the broadband reflection section 70 and controlled with the forwardly lying phase control elements 51. The illustrated embodiment can handle twelve wavelength channels individually. Add and drop are effected in separate structures in this case. The MMI structures 10 and 20 function as a splitter from beneath and upwards according to FIG. 8, for both transmission channels and add-channels. The channels are then reflected in respective Bragg grating sections. When the reflected power again reaches the first MMI structure 10 and the second MMI structure 20 respectively, the relative phase distribution in the interface between the Michelson waveguides along section B will determine where the power will be focused along section A for the first MMI-waveguide 10 and for the second MMI-waveguide 20. One of the access waveguides arranged on the MMI-waveguide 10, for instance the access waveguide 11, functions as an input for the wavelength channels, while the two remaining access waveguides function as outputs for the wavelength channels, where one of these channels is not intended for a drop-wavelength channel or for at least one drop-wavelength channel. Access waveguide 13 is coupled to access waveguide 21 via a connecting waveguide 5.

The wavelength channel or wavelength channels that has/have not been dropped to the access waveguide 12 is/are transmitted to the second MMI-waveguide 20 through said connecting waveguide 5. These wavelength channels pass through the MMI-waveguide 20. The length and the structure of the MMI-waveguide is selected so that there will be obtained in the MMI-waveguide along section B N-number of images of the light intensity from the access waveguide 21 at section A. It is assumed in this case that the length and the structure have been chosen so that three images will be obtained. If the access waveguides 21, 22 and 23 have been correctly arranged at the MMI-waveguide 20, i.e. have been dimensioned and positioned correctly, and if the cross-sectional dimensions and positions of the Michelson waveguides 41, 42 and 43 have been chosen correctly, a large part of the energy in the images will be coupled to the Michelson waveguides 41, 42 and 43. The maximum energy for these images is <1/N of the energy along section A if perfect uniformity is achieved, in this case thus <⅓ of the energy along section A. Deviation of this intensity distribution will be very small if light is instead excited from one of the access waveguides 22 or 23 along section A.

Figure 9:
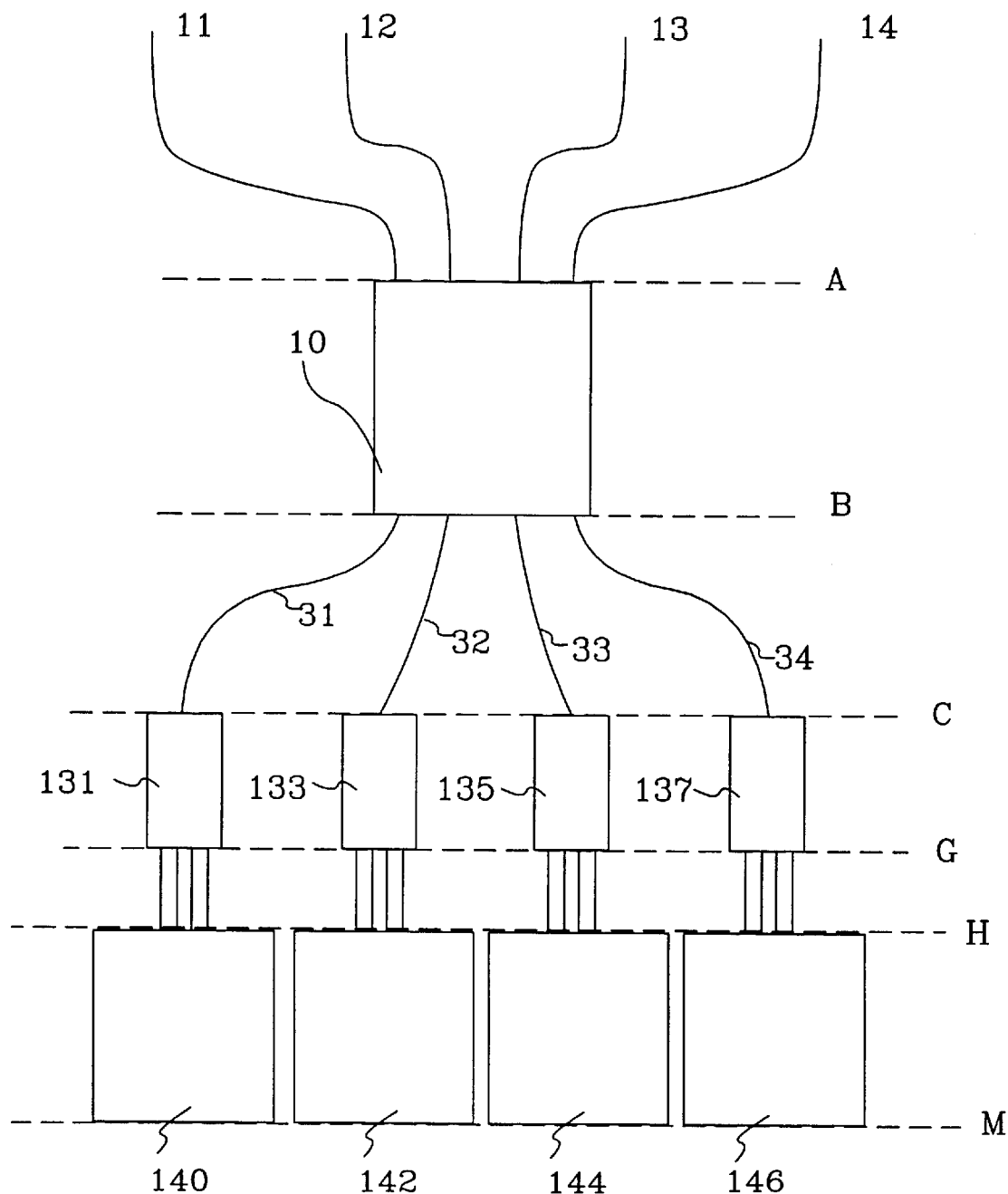
FIG. 9 illustrates still another embodiment of an inventive, tuneable add/drop multiplexer or an embodiment of a wavelength selective switch.

FIG. 9 illustrates an inventive tuneable add/drop multiplexer or a wavelength selected switch. The support lines A–M show sections that are used to describe the invention. The tuneable add/drop multiplexer or the wavelength selected switch of this embodiment includes four access waveguides 11, 12, 13 and 14, a MMI-waveguide 10, four Michelson waveguides 31, 32, 33 and 34, four N-channel demultiplexers 131, 133, 135 and 137, and four reflection sections 140, 142, 144 and 146. The access waveguides 11, 12, 13 and 14 are arranged on a first side of the MMI-waveguide 10. The Michelson waveguides 31, 32, 33 and 34 are arranged on a second side of the MMI-waveguide 10. Said N-channel demultiplexers 131, 133, 135 and 137 are arranged for respective Michelson waveguides 31, 32, 33 and 34. The reflection sections 140, 142, 144 and 146 are coupled to respective N-channel demultiplexers.

Assume that light is excited in at the access waveguide 11 belonging to the MMI-waveguide 10 at section A. The length of the MMI-waveguide 10 is chosen so that N-number of images of the light intensity from the access waveguide 11 at section A will be obtained in the MMI-waveguide 10 along section B. Also assume that the structure of the MMI-waveguide 10 and its dimensions have been chosen so as to obtain four images of the original distribution in the access waveguide 11, i.e. N=4. If the access waveguides 11, 12, 13 and 14 have been arranged correctly at the MMI-waveguide 10, i.e. have been correctly dimensioned and positioned, and if the cross-sectional dimensions and the positions of the Michelson waveguides 31, 32, 33 and 34 have been correctly chosen, a large part of the energy in the images will be coupled to the Michelson waveguides 31, 32, 33 and 34. The maximum energy for these images is <1/N of the energy along section A if perfect uniformity is achieved, in this case thus <¼ of the energy along section A. Deviation of this intensity distribution will be very small if light is instead excited from one of the access waveguides 12–14 along the section A.

Subsequent to having been excited out through the Michelson waveguides 31, 33, 35 and 37 on said second side of the MMI-waveguide 10, the wavelength channels will strike respective N-channel demultiplexers 131, 133, 135 and 137.

Figure 10:
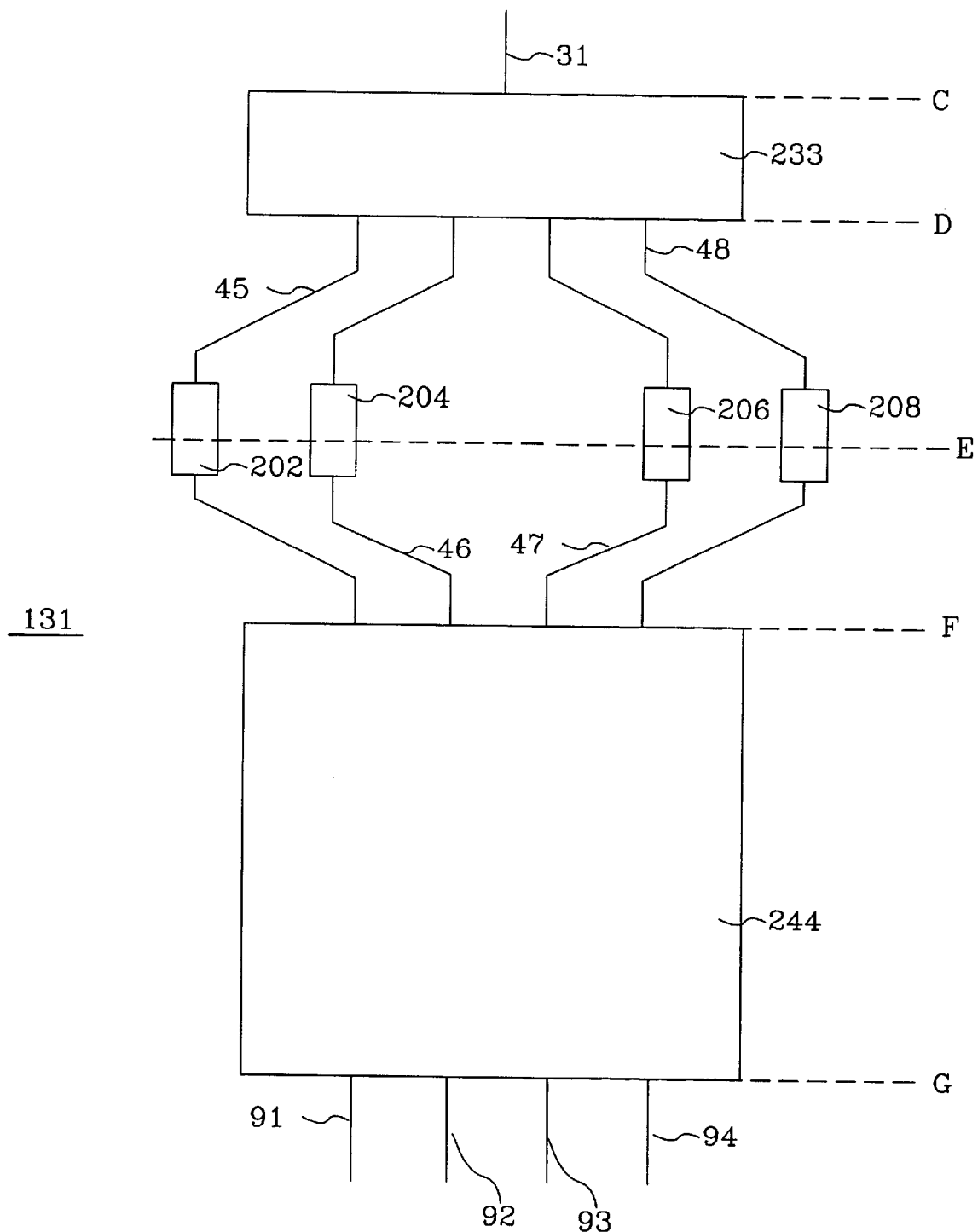
FIG. 10 illustrates an example of an N-channel demultiplexer that can be used in the inventive add/drop multiplexer or the wavelength selective switch according to FIG. 9.

A suitable N-channel demultiplexer is shown in FIG. 10. In principle, any N-channel demultiplexer will be suitable, providing that a reciprocal behaviour exists. It is very important, however, that the (de)multiplexer is periodic. This greatly facilitates the design of the Bragg grating structures. Each N-channel demultiplexer that does not include a non-reciprocal element can therefore be used. The N-channel (de)multiplexer shown in FIG. 10 is a MMIMZI-based demultiplexer (Multi Mode Interference Mach-Zehnder Interferometer), see for instance J. P. Weber, B. Stoltz and O. Öberg, "A new type of tuneable demultiplexer using a multi-leg Mach-Zehnder Interferometer", Proc. ECIO 97 EthE5, Stockholm, pp. 272–275, 1997. This (de)multiplexer has a periodic behaviour. The (de)multiplexer includes a 1×N MMI-waveguide 233 which includes a Michelson waveguide 31, 32, 33 or 34 on a first side thereof. Four Mach-Zehnder waveguides 45, 46, 47 and 48 are arranged on a second side of the 1×N MMI-waveguide. Thus, in this case, there is included a 1×4 channel demultiplexer and the MMI-waveguide 233 is a 1×4 MMI-waveguide. Respective Mach-Zehnder waveguides 45, 46, 57 and 48 include the phase control elements 202, 204, 206 and 208. The Mach-Zehnder waveguides 45, 46, 47 and 48 are also coupled to a first side of a 4×4 MMI-waveguide 244. Four Michelson waveguides 91, 92, 93 and 94 are arranged on a second side of said 4×4 MMI-waveguide.

The (de)multiplexers 131, 133, 135 and 137 distribute different wavelengths on the different Michelson waveguides 91, 92, 93 and 94.

Subsequent to having passed these N-channel (de)multiplexers, the wavelength channels strike the aforesaid reflection sections 140, 142, 144 and 146 for respective demultiplexers 131, 133, 135 and 137.

Figure 11:
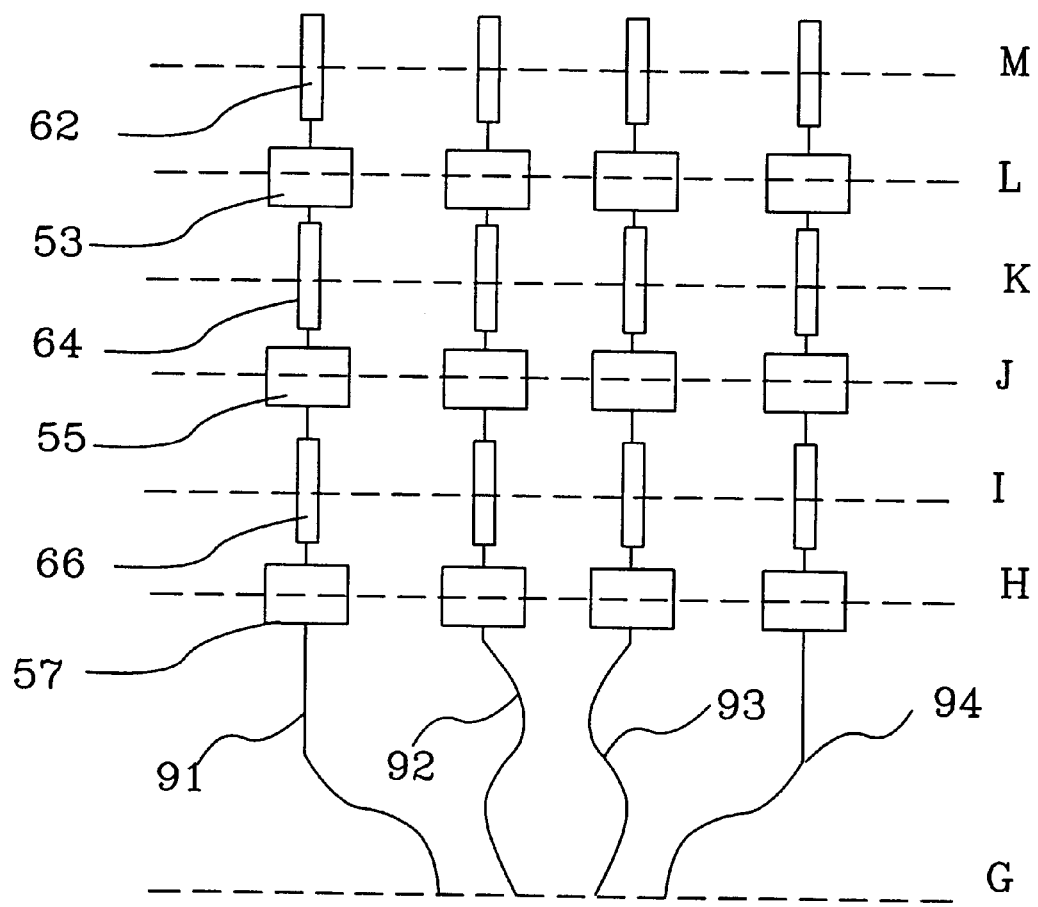
FIG. 11 illustrates an embodiment of a reflection section that can be used in the inventive add/drop multiplexer or the wavelength selective switch according to FIG. 9.

FIG. 11 shows one example of a reflection section. Sections along the support lines I, K and M denote Bragg grating sections. The Bragg grating sections for each of the Michelson waveguides along respective support lines reflect different wavelengths. Twelve different wavelengths can be reflected individually in the illustrated reflection section having four Michelson waveguides and three Bragg gratings per Michelson waveguide. In the case of N-number Michelson waveguides and M-number of Bragg gratings per Michelson waveguide, it is preferred that wavelength $\lambda 1$, $\lambda N+1, \ldots, \lambda(M-1)N+1$ is reflected in a first Michelson waveguide, that wavelength $\lambda 2, \lambda N+2, \ldots, \lambda(M-1)N+2$ is reflected in a second Michelson waveguide, and that wavelength $\lambda N, \lambda 2N, \ldots, \lambda MN$ is reflected in a last Michelson waveguide. With regard to FIG. 11, this means, for instance, that the wavelengths $\lambda 1$, $\lambda 5$ and $\lambda 9$ are reflected in the Michelson waveguide 91 and that the wavelength $\lambda 4$, $\lambda 8$ and $\lambda 12$ are reflected in the Michelson waveguide 94. Wavelengths that are reflected by a Bragg grating return to the MMI-waveguide 10 with the phase relationship determined by the phase control elements 53, 55 and 57.

Assume, for instance, that with respect to the Michelson waveguide 91, the Bragg gratings 66 along section I reflect a wavelength $\lambda 1$, and that the Bragg gratings along section K reflect a wavelength $\lambda 5$. The phase control elements 57 in Michelson waveguide 91 along section H will then determine which of the access waveguides 11–14 will be the output port for the wavelength $\lambda 1$, and the phase control elements 55 in Michelson waveguide 91 along section J will determine which of the access waveguides 11–14 will be the output port for the wavelength $\lambda 5$. The same applies along section L. In other words, respective phase control elements 53 in Michelson waveguide 91 along said section will determine which of the access waveguides 11–14 shall be the output port for the wavelength $\lambda 9$ that has been reflected by the Bragg gratings along section M in the reflection sections 140, 142, 144 and 146.

The phase relationships entering the MMI-waveguide 10 in the reverse direction can thus be selected individually for each wavelength, i.e. each wavelength channel can be given an output independent of other wavelength channels. This presumes, of course, that, e.g., the phase control elements 55 in respective Michelson waveguides along section J can compensate for phase control elements 57 in respective Michelson waveguides along section H, and that the phase control elements 53 in respective Michelson waveguides along section L can compensate for the phase control elements 53 and 57 in respective Michelson waveguides along respective sections J and H. In general, each phase control element shall be able to compensate for the upstream phase control elements in the transmission paths of respective channels along the same Michelson waveguide.

Naturally, the phase control element 57 along the support line H will also influence the wavelength channels λ5 and λ9. This compensation, however, can be easily controlled with the aid of software in accordance with theories which are well known to the person skilled in this art and which should not therefore need to be explained in more detail here. If it is not desired to control said compensation with the aid of software, the phase control elements 57, 55 and 53 can be extended successively from section H in a direction towards section L in some suitable way.

The illustrated embodiment of the tuneable add/drop multiplexer or wavelength selective switch is able to handle twelve different wavelengths individually. In other words, each of these wavelengths can be selected to be excited out to one of the four access waveguides 11, 12, 13 and 14 on the first side of the MMI-waveguide 10. When this arrangement is used as a tuneable add/drop multiplexer, only two of the four available access waveguides 11, 12, 13 and 14 will be concerned, partly the wavelength or wavelengths that is/are to be dropped, and partly the wavelength or wavelengths that are not to be dropped. When this arrangement is used as a wavelength selective switch, the switched wavelength channel can be elected to be excited to any one of the remaining three access waveguides independently of and at the same time as the remaining eleven wavelength channels.

The tuneable add/drop multiplexer or wavelength selective switch can, of course, be upgraded to include MXN-number of wavelength channels that can be handled individually instead of including only twelve wavelength channels λ1 . . . λ12 according to the aforedescribed. In general, however, in order to be able to handle MXN-number of wavelength channels independently of each other, the multiplexer or switch shall include MXN-number of different Bragg gratings, MXN-number of phase control elements, four access waveguides arranged on the first side of the MMI-waveguide, and N-number of Michelson waveguides arranged on the second side of the MMI-waveguide. One of the reflection sections 140, 142, 144 or 146 may, in principle completely lack phase control elements.

As before mentioned, the illustrated embodiment can handle individually twelve wavelength channels, wherewith the remaining wavelength channels are lost and cannot be controlled. In this case, both add and drop are performed in one and the same structure. The MMI structure functions as a splitter from the top and downwards in accordance with FIG. 9, for both transmission channels and add-channels. The channels are then reflected in respective reflection sections 140, 142, 144 and 146. When the reflected power again reaches the MMI structure, the relative phase distribution in the interface between the Michelson waveguides along section B will determine where the power will be focused along section A. Two of the access waveguides, for instance waveguides 11 and 12, can function as inputs for wavelength channels, of which one channel is intended for the add-wavelength channel, and the two remaining access waveguides function as outputs for the wavelength channels of which one is intended for the drop-wavelength channel.

The isolator 80 is used to isolate the drop-channel from the add-channel. The invention according to FIG. 3, however, can function without the isolator 80. One type of isolator that can be used in the invention is described in Electronics Letters Jun. 19, 1997, Vol. 22, No. 13, pp. 711–713, "Single Mode optical Isolator at 1.3 µm using all fibre components".

Conceivable materials suitable in the manufacture of the present invention are, e.g., quartz ($SiO_2$), polymeric materials, Lithiumiobate ($LiNbO_3$) or some semi-conductor system.

It will be understood that the invention is not restricted to the aforedescribed and illustrated exemplifying embodiments thereof, and that modifications can be made within the scope of the accompanying claims.

What is claimed is:

1. A method for the tuneable add/drop multiplexing of optical wavelength channels in an optical network, characterised in that
   said optical wavelength channels are excited into a first access waveguide arranged on a first side of an MMI-waveguide;
   at least one optical add-wavelength channel is excited into a second access waveguide arranged on the first side of said MMI-waveguide;
   the optical wavelength channels, including the add-wavelength channel, are transmitted through said MMI-waveguide and imaged on at least one Michelson waveguide arranged on the opposite side relative to said access waveguides;
   the optical wavelength channels, including the add-wavelength channel, are transmitted through the Michelson waveguide;
   at least one optical wavelength channel is reflected by at least one Bragg grating section arranged in the Michelson waveguide;
   at least one wavelength channel is dropped to a third access waveguide arranged on the first side of the MMI-waveguide; and
   at least one wavelength channel is transmitted out through a fourth access waveguide arranged on the first side of the MMI-waveguide,
   and that wavelength channels that have not been reflected individually by a Bragg grating are reflected by a broadband reflecting grating arranged in each of the Michelson waveguides.

2. A method according to claim 1, characterised in that the wavelength channels pass an N-channel demultiplexer prior to passing phase control elements and Bragg gratings, so that the number of Michelson waveguides including said Bragg gratings and said phase control elements will be N-fold, and therewith also the number of reflecting channels that can be handled individually.

3. The method of claim 1 wherein at least one of the optical wavelength channels is subject to a phase change effected by a phase control element optically coupled to a Michelson waveguide.

4. The method of claim 1 wherein none of the optical wavelength channels are subject to a phase change effected by a phase control element optically coupled to a Michelson waveguide.

5. An arrangement for tuneable add/drop multiplexing, characterised in that the arrangement includes at least one MMI-waveguide (10), at least N-number of Michelson waveguides (31, 32, 33 and 34), where N≧4, at least one Bragg grating (62, 64 and 66) per Michelson waveguide (31, 32, 33 and 34) and at least one phase control element (51, 53, 55 and 57) in at least N−1 number of Michelson waveguides (31, 32, 33 and 34) include said phase control elements (51, 53, 55 and 57) and said Bragg gratings (62, 64 and 66) and is coupled to at least one MMI-waveguide (10), and where each Michelson waveguide (31, 32 and 34) is provided with a broadband reflection section.

6. An arrangement according to claim 5, characterised in that the broadband reflection section (70) is arranged at the end of each Michelson waveguide (31, 32, 33 and 34).

7. An arrangement for tuneable add/drop multiplexing and/or wavelength selective switching, characterised in that the arrangement includes at least one MMI-waveguide (10) that on a first side is provided with at least N-number of access waveguides (11, 12, 13 and 15), where N≧3, and that is provided on a second side with at least N-number of Michelson waveguides (31, 32, 33 and 34), where N≧3, one N-channel demultiplexer (131, 133, 135 and 137) per Michelson waveguide (31, 32, 33 and 34) and one reflection section (140, 142, 144 and 146) per N-channel demultiplexer.

8. An arrangement according to claim 7, characterised in that the N-channel demultiplexer (131, 133, 135 and 137) is of the MMIMZI (Multi Mode Interference Mach-Zehnder Interferometer) type or of the AWG (Arrayed Waveguide Grating) type.

9. An arrangement according to claim 8, characterised in that the reflection sections (140, 142, 144 and 146) are mutually identical.

10. An arrangement according to claim 9, characterised in that each of the Michelson waveguides (91, 92, 93 and 94) belonging to a reflection section (140, 142, 144 and 146) includes a unique array of Bragg gratings (62, 64 and 66) which are all different.

11. An arrangement according to claim 10, characterised in that at least N−1 number of Michelson waveguides (91, 92, 93 and 94) include at least one phase control element.

12. The apparatus of claim 9, wherein each of said Michelson waveguides (91, 92, 93, and 94) belonging to a reflection section (140, 142, 144 and 146) includes an array of Bragg gratings (62, 64 and 66) wherein each Bragg grating passes light of a different wavelength.

13. An arrangement for add/drop multiplexing according to claim 7, characterised in that said arrangement is adapted for use as a wavelength selective switch.

14. An arrangement for tuneable add/drop multiplexing, characterised in that the arrangement includes at least two N×N MMI-waveguides (10 and 20), where N≧3, at least N-number of Michelson waveguides (31, 32, 33, 41, 42 and 43) per MMI-waveguide (10 and 20), at least one Bragg grating (62, 63, 64, 65, 66 and 67) per Michelson waveguide (31, 32, 33, 41, 42 and 43) and at least one phase control element (51, 52, 53, 54, 55 and 56) in at least N−1 number of Michelson waveguides (31, 32, 33, 41, 42 and 43), where said Michelson waveguides (31, 32, 33, 41, 42 and 43) include said phase control elements (51, 52, 53, 54, 55 and 56) and said Bragg gratings (62, 63, 64, 65, 66 and 67) and is coupled to a second side of the MMI-waveguides (10 and 20) and where a first (10) and a second (20) MMI-waveguide are interconnected via a connecting waveguide (5) arranged on a first side of the MMI-waveguides (10 and 20).

15. An arrangement according to claim 14, characterised in that the MMI-waveguides are of the 3×3-type.

16. An arrangement according to claim 15, characterised in that each Michelson waveguide (31, 32, 33, 41, 42 and 43) includes a broadband reflection section.

17. An arrangement according to claim 16, characterised in that the broadband reflection sections are arranged at the end of each Michelson waveguide (31, 32, 33, 41, 42 and 43).

18. An arrangement according to claim 17, characterised in that an 1×N switch (110, 111, 112, 113, 114 and 115) is provided for each Michelson waveguide (31, 32, 33, 34, 35 and 36) in connection with the second side of the MMI-waveguides (10 and 20); and in that a reflection section (120, 121, 122, 123, 124 and 125) including said Bragg gratings (62, 64 and 66) and said phase control elements (51, 53, 55 and 57) is provided for each such switch.

19. An arrangement according to claim 18, characterised in that the 1×N switch (110, 111, 112, 113, 114 and 115), where N≧1, is an MMIMZI-based switch (Multi Mode Interference Mach-Zehnder Interferometer).

20. An arrangement according to claim 18, characterised in that the reflection sections (120, 121, 122, 123, 124 and 125) include N-number of Michelson waveguides (91, 92, 93 and 94), where N≧1, at least one Bragg grating (62, 64 and 66) per Michelson waveguide (91, 92, 93 and 94), and where at least N−1 number of Michelson waveguides (91, 92, 93 and 94) includes at least one phase control element (51, 53, 55 and 57).

21. An arrangement according to claim 20, characterised in that a broadband reflection grating (70) is arranged at the end of each Michelson waveguide (91, 92, 93 and 94).

22. An arrangement according to claim 14, characterised in that the Michelson waveguides (31, 32 and 33) or the Michelson waveguides (91, 92, 93 and 94) provided at the first MMI-waveguide (10) are coupled to the Michelson waveguides (41, 42 and 43) or to the Michelson waveguides (91, 92, 93 and 94) arranged at the second MMI-waveguide (20) via a further phase control element (58) per Michelson waveguide (31, 32 and 33) or Michelson waveguide (91, 92, 93 and 94).

23. An arrangement according to claim 22, characterised in that the arrangement includes a third and a fourth N×N MMI-waveguide (30 and 40), where N≧3, wherein at least N Michelson waveguides (34, 35 and 36) are arranged between the third (30) and the fourth (40) MMI-waveguides; in that two Bragg gratings (62, 64 and 66) are included with each of said Michelson waveguides (34, 35 and 36) and at least three phase control elements (51, 53, 55 and 59) are included in at least N−1 number of Michelson waveguides (34, 35 and 36); in that the third (30) or the fourth (40) MMI-waveguide is coupled to the first (10) or to the second (20) MMI-waveguide via connecting waveguide (6); and in that the third (30) and the fourth (40) MMI-waveguides are interconnected via a connecting waveguide (7).

24. An arrangement according to claim 23, characterised in that the third (30) and the fourth (40) MMI-waveguide are of the 3×3 type.

25. An arrangement according to claim 22, characterised in that the arrangement includes a third (30) and a fourth (40) N×N MMI-waveguide (30 and 40), where N≧3, and wherein at least N Michelson waveguides (30, 35 and 36) are arranged between the third (30) and the fourth (40) MMI-waveguide, at least two 1×N switches (110, 111, 112, 113, 114 and 115) per Michelson waveguide (34, 35 and 36) and at least two reflection sections (120, 121, 122, 123, 123 and 125) per Michelson waveguide (34, 35 and 36), and where 1×N switches (110, 111, 112, 113, 114 and 115) are coupled to the Michelson waveguides (24, 35 and 36), and wherein the reflection sections (120, 121, 122, 123, 123 and 125) including N-number of Michelson waveguides (91, 92, 93 and 94), at least one Bragg grating per said Michelson waveguide (91, 92, 93 and 94) and at least one phase control element in at least N−1 of the Michelson waveguides are interconnected via an additional phase control element (59).

26. A method for tuneable add/drop multiplexing of optical wavelength channels in an optical network, characterised in that said optical wavelength channels are excited into a first access waveguide arranged on a first MMI-waveguide;

the optical wavelength channels are transmitted through said first MMI-waveguide and imaged on at least one Michelson waveguide arranged on an opposite side relative to said access waveguides;

the optical wavelength channels are transmitted through the Michelson waveguides;

none of the optical waveguide channels or at least one of the optical wavelength channels is subjected to a phase change by a phase control element arranged in any Michelson waveguide?;

at least one optical wavelength channel is reflected by a Bragg grating section arranged in the Michelson waveguides;

at least one wavelength channel is dropped to a second access waveguide arranged on the third side of the first MMI-waveguide;

at least one wavelength channel is transmitted out through a third access waveguide arranged on the first side of the first MMI-waveguide;

said wavelength channel is transmitted through a connecting waveguide arranged between the first and the second MMI-waveguides;

said wavelength channel is transmitted through said second MMI-waveguide and imaged on at least one Michelson waveguide arranged on an opposite side relative to said access waveguide;

none of the wavelength channels or at least one optical wavelength channel is subjected to a phase change in a phase control element arranged in any Michelson waveguide;

at least one optical wavelength channel is reflected by at least one Bragg grating section arranged in the Michelson waveguides;

at least one add-wavelength channel is excited into a second access waveguide arranged on the first side of the second MMI-waveguide; and at least one wavelength channel is transmitted out through a third access waveguide arranged on the first side of the second MMI-waveguide.

27. A method according to claim 26, characterised in that prior to the phase of any wavelength channel being changed by any phase control element or reflected by any Bragg grating section, there is passed a 1×N switch which increases the number of Michelson waveguides N-fold.

28. A method according to claim 26, characterised in that those wavelength channels that have not been reflected individually by a Bragg grating-section are reflected by at least one broadband reflection grating arranged in each of the Michelson waveguides.

29. A method according to claim 28, characterised in that the wavelength channel or wavelength channels transmitted out through the third access waveguide arranged on the first side of the second MMI-waveguide is/are excited in via a connecting waveguide in a first access waveguide arranged on a first side of a third MMI-waveguide;

the optical wavelength channels are transmitted through said third MMI-waveguide and imaged on at least one Michelson waveguide arranged on an opposite side relative to said access waveguide;

the optical wavelength channels are transmitted through the Michelson waveguides;

none of the optical wavelength channels or at least one of the optical wavelength channels is subjected to a phase change by any phase control element arranged in any Michelson waveguide;

at least one optical wavelength channel is reflected by a Bragg grating section arranged in the Michelson waveguides;

at least one wavelength channel is dropped to a second access waveguide arranged on the first side of the third MMI-waveguide;

at least one wavelength channel is transmitted out through a third access waveguide arranged on the first side of the third MMI-waveguide;

said wavelength channel is transmitted through a connecting waveguide arranged between the third MMI-waveguide and a fourth MMI-waveguide;

said wavelength channel is transmitted through said fourth MMI-waveguide and imaged on at least one Michelson waveguide arranged on an opposite side relative to said access waveguide;

none of the optical wavelength channels or at least one optical wavelength channel is subjected to a phase change by any phase control element arranged in any Michelson waveguide;

at least one optical wavelength channel is reflected by at least one Bragg grating section arranged in the Michelson waveguides;

at least one add-wavelength channel is excited into a second access waveguide arranged on the first side of the fourth MMI-waveguide; and in that at least one wavelength channel is transmitted out through a third access waveguide arranged on the first side of the fourth MMI-waveguide.

30. A method for the tuneable add/drop multiplexing of optical wavelength channels in an optical network comprising the steps of:

exciting said optical wavelength channels into a first access waveguide arranged on a first side of an MMI-waveguide;

exciting at least one optical add-wavelength channel into a second access waveguide arranged on the first side of said MMI-waveguide;

transmitting through said MMI-waveguide optical wavelength channels, including an optical add-wavelength channel, and imaging said optical wavelength channels on at least one Michelson waveguide arranged on the opposite side relative to said access waveguides;

transmitting through a Michelson waveguide the optical wavelength channels, including said add-wavelength channel, wherein at least one of the optical wavelength channels is subject to a phase change effected by at least one phase control element optically coupled to at least one Michelson waveguide;

reflecting at least one optical wavelength channel with a Bragg grating section optically coupled to a Michelson waveguide;

dropping at least one wavelength channel to a third access waveguide arranged on the first side of said MMI-waveguide; and transmitting at least one wavelength channel out through a fourth access waveguide arranged on the first side of said MMI-waveguide;

wherein said wavelength channels which have not been reflected individually by a Bragg grating are reflected by a broadband reflecting grating coupled to said Michelson waveguide.

31. The method of claim 30 wherein none of the optical wavelength channels are subject to a phase change effected by a phase control element optically coupled to a Michelson waveguide.

32. An apparatus for tuneable add/drop multiplexing, said apparatus comprising:

at least two N×N MMI-waveguides (10 and 20), where N≧3, said MMI-wave guides each having a first and a second side, at least N-number of Michelson waveguides (31, 32, 33, 41, 42 and 43) per MMI-waveguide (10 and 20), at least one Bragg grating (62, 63, 64, 65, 66 and 67) per Michelson waveguide (31, 32, 33, 41, 42 and 43) and at least one phase control element (51, 52, 53, 54, 55 and 56) in at least N−1 number of said Michelson waveguides (31, 32, 33, 41, 42 and 43), wherein said Michelson waveguides (31, 32, 33, 41, 42 and 43) include said phase control elements (51, 52, 53, 54, 55 and 56) and said Bragg gratings (62, 63, 64, 65, 66 and 67) and is coupled to said second side of the MMI-waveguides (10 and 20) and where a first (10) and a second (20) MMI-waveguide are interconnected via a connecting waveguide (5) arranged on said fist side of said MMI-waveguides (10 and 20).

33. The apparatus of claim 32, wherein, said MMI-waveguides are of the 3×3-type, and said Michelson waveguides (31, 32, 33, 41, 42 and 43) each have a broadband reflection section (70), said broadband reflection section (70) being optically coupled to said Michelson waveguide (31, 32, 33, 41, 42 and 43).

34. The apparatus of claim 33, further comprising, a 1×N switch (110, 111, 112, 113, 114 and 115) each said being coupled to said second side of at least one of said MMI-waveguides (10 and 20) via a Michelson waveguide (31, 32, 33, 34, 35 and 36);

each switch further comprising a reflection section (120, 121, 122, 123, 124 and 125) including said Bragg gratings (62, 64, and 66) coupled to said phase control elements (51, 53, 55 and 57).

* * * * *